United States Patent
Link, II

(10) Patent No.: US 10,600,265 B2
(45) Date of Patent: *Mar. 24, 2020

(54) METHOD AND SYSTEM FOR SECURELY AUTHENTICATING AN ELECTRONIC USER DEVICE TO A VEHICLE

(71) Applicant: M2MD Technologies, Inc., Atlanta, GA (US)

(72) Inventor: Charles M. Link, II, Atlanta, GA (US)

(73) Assignee: M2MD TECHNOLOGIES INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,173

(22) Filed: May 1, 2019

(65) Prior Publication Data

US 2019/0259229 A1    Aug. 22, 2019

Related U.S. Application Data

(63) Continuation of application No. 15/833,631, filed on Dec. 6, 2017, now Pat. No. 10,332,327, which is a
(Continued)

(51) Int. Cl.
*H04L 29/06* (2006.01)
*G07C 9/00* (2020.01)
(Continued)

(52) U.S. Cl.
CPC .......... *G07C 9/00182* (2013.01); *B60R 25/24* (2013.01); *G06F 21/34* (2013.01);
(Continued)

(58) Field of Classification Search
CPC ....... H04L 63/123; H04L 63/08; H04L 67/12; H04L 63/0853; G07C 2009/00198;
(Continued)

(56) References Cited

U.S. PATENT DOCUMENTS 9,865,110 B2 *  1/2018  Link, II ................ H04L 63/123
10,013,828 B2 *  7/2018  Link, II ................ H04L 63/123
(Continued)

*Primary Examiner* — Baotran N To
(74) *Attorney, Agent, or Firm* — John L. Doughty; Doughty Law, L.L.C.

(57) ABSTRACT

A vehicle processing device authenticates that an authorized user has requested an action by the vehicle and generates an authentication acknowledgement message. At least two security devices being present within the cabin of, or close to, the vehicle during a predetermined period following an authentication trigger event that occurs while the user performs a predetermined sequence of authentication activities (i.e., button presses, operating the vehicle or a part of it, etc.) provides a basis for the authentication acknowledgement message. Typically, information unique to each security device has been associated with the vehicle at a service provider's server. The authentication acknowledgement may include an activation code that results from processing the information, unique to each security device, received from the security devices and other random information, such as date. A service provider's server, or a user device, provides services to, or can access, respectively, the vehicle upon receiving the authentication acknowledgement.

20 Claims, 13 Drawing Sheets

Related U.S. Application Data continuation of application No. 15/072,087, filed on Mar. 16, 2016, now Pat. No. 9,865,110.

(60) Provisional application No. 62/165,358, filed on May 22, 2015.

(51) Int. Cl.

| | | |
|---|---|---|
| *H04W 12/06* | (2009.01) | |
| *H04W 4/80* | (2018.01) | |
| *H04W 4/021* | (2018.01) | |
| *H04W 4/40* | (2018.01) | |
| *H04W 12/00* | (2009.01) | |
| *H04L 29/08* | (2006.01) | |
| *B60R 25/24* | (2013.01) | |
| *G06F 21/34* | (2013.01) | |
| *G06F 21/35* | (2013.01) | |
| *G06F 21/44* | (2013.01) | |

(52) U.S. Cl.
CPC .............. *G06F 21/35* (2013.01); *G06F 21/44* (2013.01); *H04L 63/08* (2013.01); *H04L 63/0853* (2013.01); *H04L 63/123* (2013.01); *H04L 67/12* (2013.01); *H04W 4/021* (2013.01); *H04W 4/40* (2018.02); *H04W 4/80* (2018.02); *H04W 12/0023* (2019.01); *H04W 12/06* (2013.01); *B60R 2325/205* (2013.01); *G06F 2221/2113* (2013.01); *G07C 2009/00198* (2013.01); *H04W 12/00502* (2019.01); *H04W 12/00503* (2019.01); *H04W 12/00522* (2019.01)

(58) Field of Classification Search
CPC ......... G07C 9/00182; G06F 2221/2113; G06F 21/44; G06F 21/34; G06F 21/35; G06F 21/00; G06F 21/30; G06F 21/43; G06F 21/62; B60R 2325/205; B60R 25/24; H04W 4/008; H04W 12/06; H04B 5/00; H04B 5/02; G08C 17/02
See application file for complete search history.

(56) References Cited

U.S. PATENT DOCUMENTS

| | | | | |
|---|---|---|---|---|
| 10,332,327 | B2* | 6/2019 | Link, II | ................ H04L 63/123 |
| 2012/0221173 | A1* | 8/2012 | Ampunan | ............ B60R 16/037 |
| | | | | 701/2 |
| 2014/0096217 | A1* | 4/2014 | Lehmann | ................ H04L 63/08 |
| | | | | 726/7 |
| 2014/0277837 | A1* | 9/2014 | Hatton | .................... B60R 25/24 |
| | | | | 701/2 |
| 2014/0279707 | A1* | 9/2014 | Joshua | ............... G06Q 30/0283 |
| | | | | 705/400 |
| 2016/0055699 | A1* | 2/2016 | Vincenti | ............ G07C 9/00309 |
| | | | | 340/5.61 |

* cited by examiner

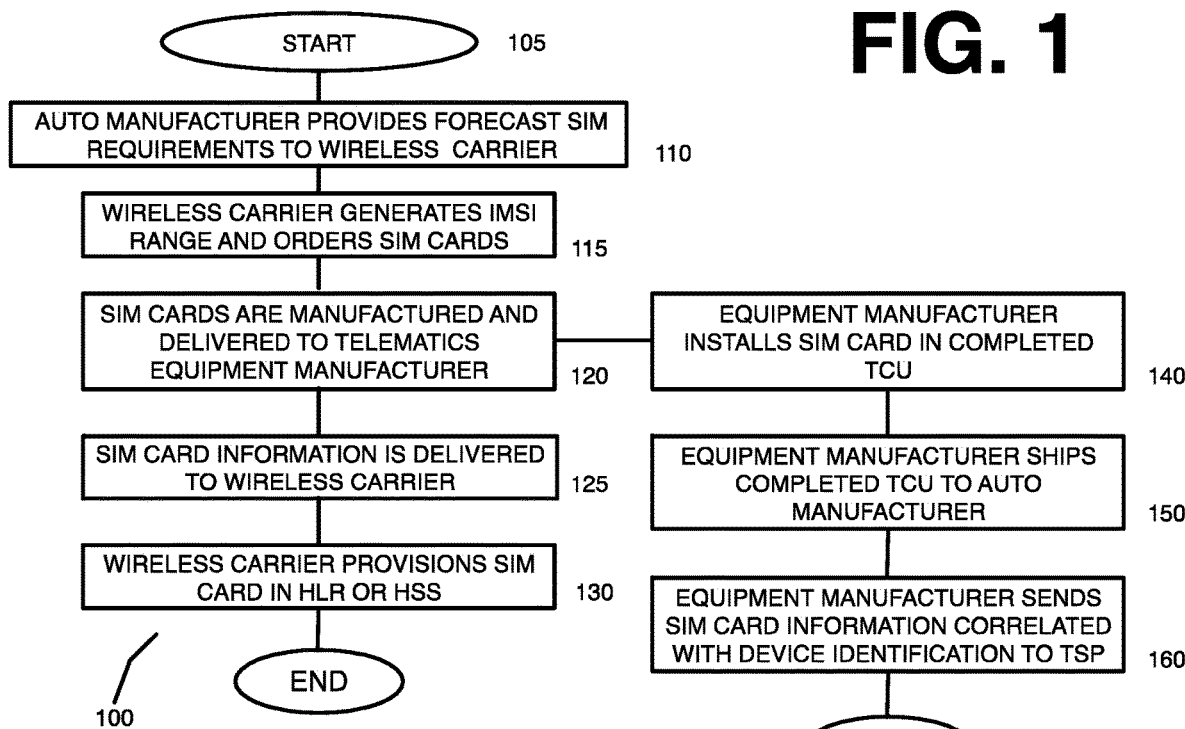
FIG. 1
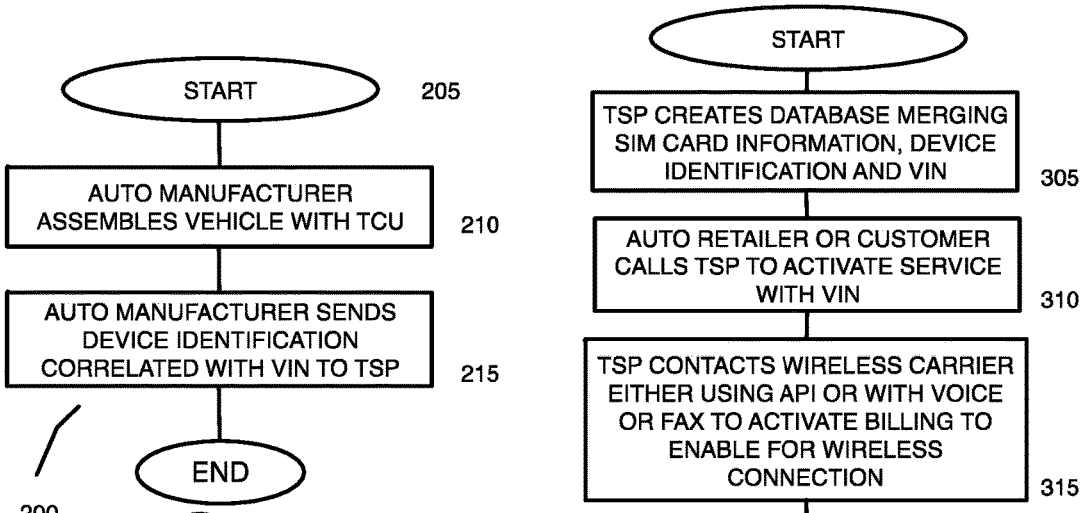
FIG. 2
FIG. 3

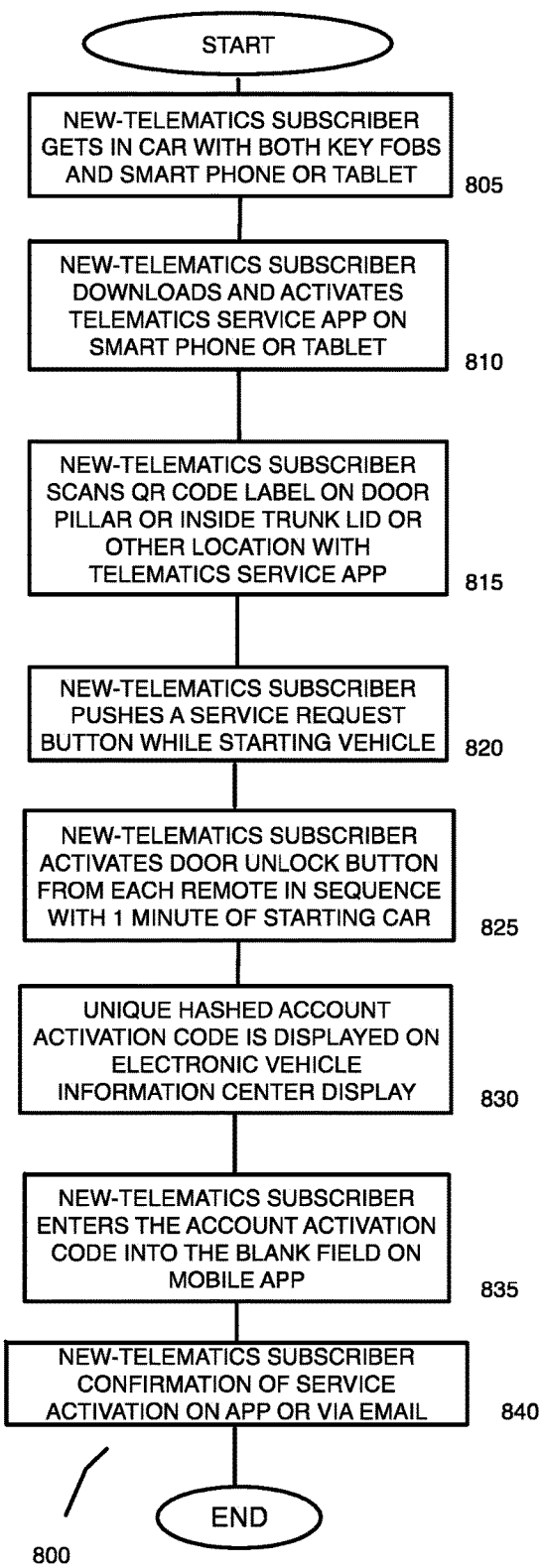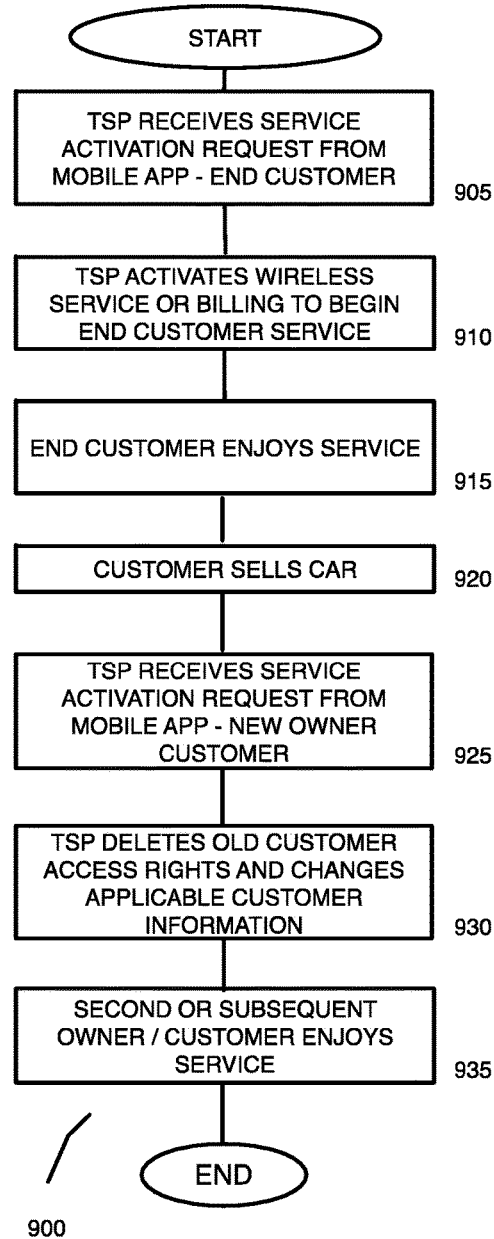
FIG. 8
FIG. 9

FIG 13 HEAD UNIT QR Code Example

Vehicle equipment and parameters are included in the QR code:

VIN: 3FADP4EJ9BM987654
IMSI:310410199999999
TCU ID: 9987654321
ENCRYPTION CODE: ASDFGHJKL1234567890
AUTHENTICATION CODE: 1234567899
TECHNOLOGY: 4G NO VOICE WIFI
BANDS: 2,4,5,12,13,17
NAV: 10 POI MAPV2017ON-BOARD
RDL,RDU,RSTART,PREC,RFLASH,RHORN

MESSAGE:
3FADP4EJ9BM987654.310410199999999.9987654321.ASDFGHJKL1234567890.1234567899.4G NO VOICE WIFI.2,4,5,12,13,17.10 POI MAPV2017ON-BOARD.RDL,RDU,RSTART,PREC,RFLASH,RHORN

This dynamically generated QR Code includes the Authentication Code, certifying the existence of two smart keys present in the car.

FIG. 13

FIG 14 Door Post QR Code Example

Vehicle equipment and parameters are included in the QR code:

VIN: 3FADP4EJ9BM987654
IMSI:310410199999999
TCU ID: 9987654321
ENCRYPTION CODE: ASDFGHJKL1234567890
TECHNOLOGY: 4G NO VOICE WIFI
BANDS: 2,4,5,12,13,17
NAV: 10 POI MAPV2017ON-BOARD
RDL,RDU,RSTART,PREC,RFLASH,RHORN

MESSAGE:
3FADP4EJ9BM987654.310410199999999.9987654321.ASDFGHJKL1234567890.
4G NO VOICE WIFI.2,4,5,12,13,17.10 POI MAPV2017ON-BOARD.RDL,RDU,
RSTART,PREC,RFLASH,RHORN

This static QR Code is printed on a label affixed to a door post or inside the trunk lid but does not include the Authentication Code to certifying the existence of two smart keys present in the car.

FIG. 14

METHOD AND SYSTEM FOR SECURELY AUTHENTICATING AN ELECTRONIC USER DEVICE TO A VEHICLE

CROSS REFERENCE TO RELATED APPLICATION

This application claims priority under 35 U.S.C. 119(e) to U.S. provisional patent application No. 62/165,358 entitled "Method and system for securely subscribing to telematics service," which was filed May 22, 2015, and this application claims priority under 35 U.S.C. 120 to, and is a continuation of, U.S. patent application Ser. No. 15/833,631 entitled "Method and system for providing telematics services to a machine device," which was filed Dec. 6, 2017, which is a continuation of U.S. patent application Ser. No. 15/072,087 entitled "Method and system for securely and automatically obtaining services from a machine device services server," which was filed Mar. 16, 2016, and which claims priority to 62/165,358, all of which applications are incorporated herein by reference in their entireties.

FIELD

This field relates, generally, to wireless electronic devices and systems, and methods for securely and wirelessly associating them with devices coupled to a vehicle's communication bus.

BACKGROUND

Telematics may refer to the integrated use of telecommunications devices and systems and information storage, usage, transmitting, receiving, and processing. More simply, telematics may refer to sending, receiving and storing, information via telecommunication devices. Telematics devices and system have been applied alongside Global Positioning System ("GPS") technology integrated with computers and mobile communications technology in automotive information and navigation systems.

Other than the convergence of telecommunications and information processing, the term telematics may also refer to automation of various processes relating to the driving and using of automobiles. For example, a telematics system can report emergency situations to a telematics service provider's central location via a voice telephone call over a wireless communications network, or a message sent electronically over a network, including a wireless communications network and the Internet. Telematics also includes services such as GPS navigation, integrated hands-free cellular telephony, wireless safety communications, and automatic driving assistance and information systems such as traffic, restaurant, fuel, and emissions information. IEEE standard 802.11p refers to Wireless Access for the Vehicular Environment to facilitate and enhance Intelligent Transportation.

A telematics services provider ("TSP") typically operates a call center staffed with live operators who respond to emergency calls and to contact the appropriate responders to the emergency; the live operators also typically perform customer service tasks during real-time conversations with a user/subscriber, or with subscribers-to-be as they register their telematics device for service. The TSP also typically has a telecommunications operations center ("TOC"), which typically includes a computer server and other networking equipment to connect the server with various networks such as the Internet. A telematics control unit ("TCU") installed in a vehicle, either at the time of manufacture, or after the vehicle was placed in service, typically contains a GPS portion (which portion may be referred to as a GPS circuit or a GPS module), a cellular telephony portion (which may be referred to as a cellular, or long range wireless, portion, circuit, or module), and general computer electronics such as a memory, a general processor, I/O interface, etc., which are coupled to the GPS portion and to the cellular portion.

A subscriber typically pays a monthly service charge to the TSP. The TSP establishes and maintains a wireless service subscription with the wireless carrier, such as a cellular telephone service provider, so that the TCU can communicate with the TOC via wireless and Internet. This connection also facilitates Internet availability and functionality for a subscriber in the vehicle thru the TCU. In addition, Internet connectivity facilitates a subscriber transmitting and receiving information between car and a personal computer, smart phone or tablet or other computer device connected to the Internet.

A TSP typically establishes an account with a long range wireless carrier, such as AT&T or Verizon, (the establishing of an account may be referred to as activating or provisioning a wireless account) so that a TCU can communicate across the wireless carrier's wireless (typically cellular) network. After a TCU has been installed in a vehicle, the vehicle's manufacturer, or the retail dealer selling the vehicle, typically obtains a unique identifier of the TCU, the vehicle's Vehicle Identification Number ("VIN"), a unique identifier corresponding to the wireless telephony portion of the TCU, and the vehicle owner's name and forwards the identifiers and vehicle owner's name to the TSP. The unique identifier of the wireless telephony portion typically includes an International Mobile Subscriber Identity ("IMSI") and/or Integrated Circuit Card ID ("ICCID") for mobile network access devices using GSM, UMTS, or LTE wireless technology. The TSP may manually obtain the mobile unit's unique identifier and manually forward it to a wireless carrier via a voice telephone call, or completing form and mailing, or sending via facsimile or e-mail, to the wireless carrier. The TSP may electronically communicate with the wireless carrier using a predefined Application Programming Interface ("API") to activate wireless service. The wireless service provider typically begins billing the TSP for wireless service for the specific activated account upon activating the wireless portion of the TCU for wireless service. The TSP typically begins billing the vehicle owner/subscriber for telematics services upon receiving payment information from the vehicle owner, or someone claiming to be the vehicle owner, or from someone claiming to have authority from the vehicle owner to activate a telematics services account for the vehicle owner's vehicle.

Alternatively, wireless service may be configured for automatic start of billing based on other service indicators. One specific implementation starts with the creation of the hardware necessary for service. For example, GSM, UMTS or LTE wireless service typically uses a Subscriber Identity Module ("SIM") embedded within the TCU to permanently establish the ICCID/IMSI of a TCU. The IMSI is used for over-the-air service identification and is unique in the world. The SIM contains other security keys and information that are used to authenticate the identity of the specific wireless device. Methods and algorithms developed by the wireless communication industry ensure the SIM card's uniqueness, and the ability to authenticate and validate the wireless device containing the SIM.

The IMSI/ICCID and other service credentials can be preloaded into a carrier's network control elements for immediate use prior to any wireless service-billing establishment. For example, GSM, UMTS and LTE wireless networks contain a Home Location Register ("HLR") and/or Home Subscriber Server ("HSS") for managing SIM card credentials on the network side. For a wireless device, whether it is a simple cell phone, a smart phone, a tablet with Wireless Wide Area Network ("WWAN") functionality, or a TCU, to operate on the WWAN, its identity and security credentials are typically configured, recognized, and acknowledged before WWAN service may be allowed. As described above, this is referred to as activating or provisioning a wireless account. By preloading the SIM credentials into the long range wireless carrier's network control elements, the TCU, along the vehicle telematics services, including wireless network access, can be used immediately after vehicle purchase without any other prior arrangements by the vehicle owner to establish a subscription for long range wireless service with the carrier.

With the automatic wireless service provisioning capability offered by wireless service providers, a streamlined service establishment system could be developed. As described previously, the retail dealer selling the vehicle still manually forwards or automatically forwards thru electronic interchange, the vehicle owner/subscriber information to the TSP for telematics service account creation. In one variation of the subscription process, the point-of-sale data processing system automatically creates an electronic data interchange message that forwards the new-vehicle-owner's information to the TSP for telematics service establishment. (It will be appreciated that reference to a 'new-vehicle' also includes reference to a used vehicle that an owner has just purchased.) In a second variation of the subscription process, the new-vehicle owner provides the new-vehicle-owner's information directly to a TSP call answering representative by pushing a service request button inside of the vehicle. The service request button establishes a voice connection using the previously provisioned wireless network connection to communicate directly with the TSP. In each scenario just described, systematic challenges exist and neither existing scenario eliminates the various subscription dilemmas faced by vehicle manufacturers and TSPs.

Although the first subscription method described above solves some of the challenges of service establishment for telematics equipped new vehicles, it requires a positive action on the part of the new-vehicle-owner to accept, at the point-of-sale, the terms-of-offered service, including acceptance of possible personal privacy infringement that accompanies the offered telematics services. The new-vehicle-owner must make a complex decision without adequate time to understand the privacy implications. Even if the customer (i.e., the new-vehicle-owner) accepts the terms-of-service and accepts the service, a significantly complex data interchange system is required to facilitate the automatic transmittal of service information. In existing scenarios, automatic transmittal systems don't forward customer information until the selling retail dealer chooses to forward the vehicle sales notification to the vehicle manufacturer, distributor, or importer. This selling notification from the selling dealer may be delayed because of purposeful attempts to maximize dealer incentives that may be only offered in the last three days of the month, for example. This delay could block or prevent a new-vehicle purchaser from fully utilizing the services that are offered as part of the vehicle or purchased as part of a subscription. This delay also degrades an otherwise nearly optimal first-owner subscription solution. (From the perspective of the TSP, a new-vehicle-owner's likelihood of subscribing to telematics services declines as time passes after leaving a dealership after purchasing the vehicle, whether new or used.)

The second subscription method described above solves some of the challenges presented above for service establishment. The new-vehicle-owner can press a service request button within the vehicle that might otherwise be used for emergency or routine service requests and speak directly with a TSP call center representative to establish service. This action can be taken on the selling dealer's lot, or elsewhere several days or weeks after the vehicle is purchased. This allows the new-vehicle owner to fully understand the implications associated his decision to accept or reject the terms-of-service. After the new-vehicle owner presses the button, the TCU installed within vehicle powers up and establishes a wireless service connection directly to the TSP over the prearranged wireless carrier using the installed SIM card containing the prearranged credentials and previously activated or provisioned account. The billing for the wireless service, from the wireless carrier to the TSP, or to the new-vehicle manufacturer, could begin based upon predefined triggers, including a first voice call, or a data usage amount greater than a prearranged threshold. The new-vehicle-owner can aurally accept the terms-of-service and can initiate telematics service with the TSP, and if required, the new-vehicle-owner can communicate subscription credentials such as name and address and possible payment means (e.g., a credit card number; bank account number; smart-phone identifier such as IMSI, MAC address, phone number, or account number, etc.) as necessary.

In past subscription models, a vehicle may have been provided to the new-vehicle-owner without prepaid service (i.e., without having been separately paid for by the new-vehicle-owner), but with the telematics services provided on a trial basis for a short period of time after the purchase of the vehicle. Although different methods have been used for establishment of service and setting the initial service date, a mechanism was required to communicate the vehicle sales date for determination of commencement of a trial services period and for determination of commencement of payment to third-party TSPs. For one-way services like Automatic Crash Notification ("ACN") or Emergency Calling ("ECALL"), telematics service providers did not necessarily need customer information and customers could enjoy such 'Safety and Security' services without providing customer specific information until the trial period ended. If the new-vehicle-owner, or customer, chose to subscribe for an additional period of time, (i.e., beyond the trial period) it was up to the customer to establish contact with the telematics service provider and agree upon a method for payment for the service period extension.

In addition to traditional safety and Security services, vehicle manufacturers offer services that allow wireless interaction between the vehicle and the owner using a personal computer ("PC"), smart phone, tablet computer, or other device connected in some way to the Internet. These services include, but are not limited to, remote-door unlock, vehicle-trip reporting, vehicle location, battery-charge status, vehicle remote-start, climate pre-conditioning, fuel status, point-of-interest downloading and many other remotely requested or controlled services. In previous telematics service implementations that included only basic "remote-door unlock," the vehicle-owner/operator and selling dealer manually established a password directly with the telematics service provider in order to authenticate the remote-door unlock service request. This pre-established password was transmitted, either aurally or by a facsimile, from the new-vehicle selling dealer to the TSP. When the service was used, the customer typically contacted the TSP and aurally authenticated the service request before the TSP remotely activated the remote-door unlock. Since this service was limited, and only provided interior vehicle access to an otherwise locked vehicle, it was considered secure enough.

Many new-vehicle telematics services don't include voice-calling capability within the vehicle. For example, one method of ownership authentication in current telematics services offering provides that anyone who has physical access to the vehicle is the de facto owner of the vehicle. If a person has physical access to the vehicle and can contact the TSP call center representative through the vehicle's integrated voice communication channel used for emergency calling or routine service requests, that person can arrange for telematics services subscription and pairing of that vehicle for remote services. Of course, this method requires the prearranged wireless network access. Some service providers require a credit card number for guaranteeing payment for services. Based on the premise that no one would make a payment for services for the pleasure and enjoyment of someone else, this model has prevailed. However, heretofore, information coming from the vehicle has been limited: For example, a vehicle owner has not had the ability to track his own vehicle, and location information of the vehicle has only been available to the TSP in the event of a crash, or a determination of a validated and documented stolen vehicle event, and the only remote control service was remote-door unlock.

The method just discussed provides a low level of security for telematics services offered in older year models. Those services were limited and third-party knowledge or access to the vehicle provided little or no gain for the potentially interested third party. However, newer services, such as vehicle-trip reports, and parking finder applications could provide information of significant value to various third parties. Vehicle trip reports could provide aid economic or industrial espionage. Vehicle trip reports could provide location information to interested spouses in domestic violence cases. It could lead to spousal tracking by jealous estranged partners. Future services that might include keyless vehicle operation with a smart-phone typically should require absolute authentication over the entire life of the vehicle, not just to the first owner. Information and account access for telematics solutions including the new services should be secure so that an estranged spouse, valet, mechanic or even a potential purchaser on a test drive can not create his own account in the system for illicit purposes.

Many new-vehicle manufacturers include, or intend to include, lifetime telematics service with the purchase price of the vehicle. This service is important with electric vehicles; although an electric vehicle is operable and usable without remote charge status and climate pre-conditioning, operation without connected telematics is not desirable because of the likelihood of unexpected battery-charge depletion vis-a-vis the more familiar, and less-frequently-occurring, low fuel situation encountered while operating conventional fossil-fuel-power vehicles. Foolproof switching of service from a previous owner to a new owner for a pre-owned vehicle without the associated costs of a round-the-clock contact center is desirable for vehicle manufacturers. With the context of the likelihood of active telematics services being maintained for the lifetime of a vehicle, the solutions discussed herein obviate the need to maintain a human contact point for the purpose of account activation and account maintenance.

With the large number of other remote services and with the operation of many or all of these services no longer requiring a voice call to a TSP call center representative, a more secure method to establish initial service is desirable. Additionally, if a trusted new-car-selling dealer does not establish telematics service immediately, then an automatic service authentication method should be offered to the new-telematics subscriber. A subscription/pairing method should be offered to purchasers of vehicles who are not necessarily the first owner and for vehicles that are sold by others that are not necessarily new-vehicle dealers, without compromising subscription security.

SUMMARY

The methods and systems discussed herein facilitate: authenticating ownership and pairing of a telematics device of a telematics equipped vehicle using remote telematics controllers such as a PC, smart phone, or a tablet are discussed; establishing wireless service for vehicles containing telematics control units without depending upon pre-loaded or pre-provisioned credentials within the wireless carrier's network control elements is discussed; and establishing secure pairing of the second or subsequent owner, while excluding the previous owner's credentials.

As previously described, telematics service to a vehicle's telematics device uses a wireless connection between the vehicle and some other device or telematics control center. In a current telematics context, a vehicle telematics device is typically permanently provisioned for financially undesirable lifetime-of-the-vehicle long range wireless service. Even though a wireless carrier may provide wireless services for ten or more years at a single price, whether a telematics service subscription exists, this service offering entails costs that must be borne by someone, or some entity. The long-range wireless costs may be embedded into a composite fleet price charged to the vehicle manufacturer or the TSP, or the wireless carrier may consider it breakage. Regardless, provisioned but inactive wireless service comes at a cost. One is to eliminate the cost of provisioned but inactive long-range wireless service and automate the operation of provisioning a device, such as a telematics device in a vehicle.

Another aspect is to eliminate the human, manual intervention and uncertainty associated with the identity of the subscriber and to authenticate the ownership before allowing vehicle pairing and remote access. Currently this authentication of ownership is haphazard, and provisioning does not actually require proof of ownership rights. Rather, provisioning typically only needs physical access to a vehicle for a short period of time during the provisioning process.

Although a new solution to the basic problem of human intervention requirements and a lack of a proof of ownership requirement for telematics service enablement is described, it should be recognized by those skilled in the art that various aspects disclosed herein may be individually applied to solve some or all of the problems described in this disclosure.

An object is to solve the issue of authenticating ownership among various parties who might have (or had) access to the vehicle. Many vehicle manufacturers have struggled with this challenge. Many manufacturers have suggested, though not implemented, using bar codes hidden on the inside of the vehicle trunk lid or special forms containing unique vehicle-specific access codes stored in the glove box or other "special" locations. One vehicle manufacturer suggested that this would work because drivers routinely locked the access to the glove box and trunk with the removable valet key (a physical key generally stored in the electronic RF remote) before handing over the RF remote. Some manufacturers have suggested having the radio head unit generate and display a unique "account setup key." Each of these solutions shares a common problem: Each is fallible because knowledge of a universal solution and even limited, short-duration access that a valet may have, or even a prospective buyer on a test drive may have, is all that is necessary to compromise the otherwise "secure" system.

Requiring that two smart keys, smart fobs, or other smart devices both be present in the vehicle for telematics setup and pairing thwarts unauthorized telematics setup and pairing because rarely does anyone other than the bona fide owner, or a seller, such as a vehicle dealer, ever have simultaneous possession of both smart keys that permit keyless entry and ignition. Since the owner has access to both smart keys simultaneously and access to the vehicle, using a system that requires both smart keys to be present within the vehicle during a predefine period solves the subscription enablement dilemma. It should be apparent that there are numerous key systems in use. Some vehicles have smart keys while others simply have keyless access systems for door and trunk access (i.e., using wireless fobs), while others have keys with RFID tags. With each of these systems, as long as the remotes or RFIDs or smart keys are each unique, the system will be secure. For purposes of discussion herein, the term security device refers to these, and similar, smart access devices discussed in this paragraph and elsewhere herein.

BRIEF DESCRIPTION OF DRAWINGS

FIG. 1 illustrates a flow diagram of steps followed by an auto manufacturer to purchase a completed telematics control unit from a third-party hardware manufacturer which installs a SIM card containing wireless credentials in the TCU.

FIG. 2 illustrates a flow diagram of an existing process performed by an auto manufacturer to equip a vehicle with a telematics control unit for activation and service at a later date.

FIG. 3 illustrates a flow diagram of an existing process to establish a telematics service account and to set up a wireless subscription for a telematics control unit in a vehicle.

FIG. 8 illustrates a flow diagram of a preferred method for setting up telematics service, as seen from the new-telematics subscriber's perspective.

FIG. 9 illustrates a flow diagram of a method performed by a TSP server for automatically authenticating a vehicle owner and setting up a new telematics service account.

FIG. 13 illustrates an example of a dynamically-generated QR code displayed on a display of a vehicle. The QR contains an authentication code generated after a successful determination that two security devices that are uniquely associated with the vehicle were present in the vehicle during a predetermined telematics service initiation period.

FIG. 14 illustrates an example of a static QR code that is affixed to a vehicle that contains information unique to the vehicle. This static QR code includes vehicle-specific information, including a unique identifier of the vehicle, but does not include a dynamically-generated authentication code.

DETAILED DESCRIPTION

Figure 4:
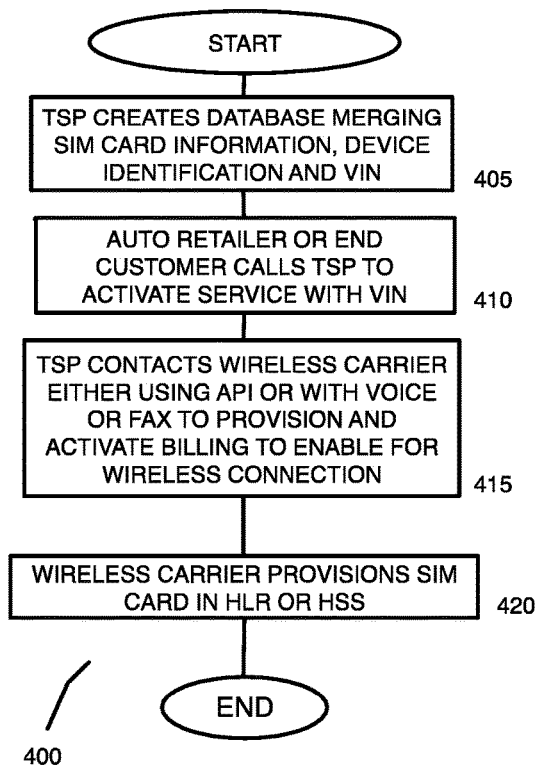
FIG. 4 illustrates a flow diagram of a current process performed by a telematics service provider for activation of a telematics control unit without pre-provisioned wireless connectivity.

As a preliminary matter, it will be readily understood by those persons skilled in the art that aspects described herein are susceptible of broad utility and application. Many methods, embodiments, and adaptations other than those herein described as well as many variations, modifications and equivalent arrangements, will be apparent from or reasonably suggested by the substance or scope of the aspects described herein.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Security devices, such as the smart keys provided by the automobile manufacturers generally fit into three categories. One technology uses a passive transponder car key. Another technology uses a one-way transmitter for remote keyless access. The third system uses an active receiver/transmitter or passive receiver/active transmitter (transponder) that subsequently responds to remote pings from the vehicle to confirm the presence and authenticate the validity of the smart key, or other type of security device.

When a passive transponder car key (i.e., a security device) is turned in the ignition lock, the engine control unit ("ECU") on the car sends an electronic query to the key; the ECU will allow the car to start only if it receives the correct response message from the key. This solution uses a form of RFID where a simple passive key without any power source or buttons, but mechanically cut correctly, first turns the lock and then the RFID portion responds to a request from the ECU query with a preprogrammed digital response code to allow the car to start. Most transponder keys contain passive circuits in the plastic or rubber bow of a key. An induction coil is mounted around the ignition lock to send out an electromagnetic field of energy. The windings of the transponder chip in the bow of the key absorb that energy thru the plastic or rubber and power the electronic chip to emit the coded response signal. The induction coil reads the response signal from the chip and sends it to an onboard computer device, such as the ECU, to validate the response code. If the response code matches that of one of the stored codes, the vehicle starter is engaged. Although older immobilizer systems may have programmed each of the keys of a specific vehicle to all send the same desired response, more modern solutions use a pairing process that pairs, or associates, the keys with the vehicle where the vehicle captures and stores a response from each unique new key by using a pairing/associating mechanism, typically known only to dealers authorized by the vehicle's manufacturer. As long as the pairing, or associating, mechanism is secure and the passive transponder keys each generate a unique response code, the methods described herein can be used for telematics service subscription and account setup, as well as for implementation of other features such as associating an owner's smart phone or payment device (such as a credit card, a near field device containing a payment authorization code or identifier, or other similar payment mode), with the vehicle, or associating a tablet device or short range wireless access point, or hot spot, with the vehicle. Immobilizer systems based on passive transponding keys are rarely used in new cars today due to the simplicity of the response code and the relative insecurity of those systems compared to more modern systems.

In the scenario just mentioned where a smart phone, or tablet, may be paired, or associated, with the vehicle, typically the smart phone, or similar user device, would be authenticated by a vehicle processing device of the vehicle that is coupled to a communication bus of the vehicle (e.g., Controller Area Network ("CAN"), Local Interconnect Network ("Lin"), which is typically used for sub-networks, Media Oriented Systems Transport ("MOST") typically used for entertainment systems and devices, I2C, SPI, FlexRay, SAE-J1850, APC, and others). The processing device can process messages received on the bus and can transmit messages to other devices and modules coupled to the bus, such as transmitters and receivers which may be wireless (the vehicle processing device itself may include transmitters and receivers, or may be configured to process messages from and to separate transmitters and receivers). Thus, when a user device such as a smart phone or other user computing device is paired/associated with the vehicle processing device, the smart phone may be configured, typically by way of an application, to operate certain functions of the vehicle, including remote start, remote HVAC control, even remote steering, braking, and movement control. Examples of a vehicle processing device coupled to the communication bus of the vehicle include a telematics control unit ("TCU"), an engine control module ("ECM"), a transmission control module ("TCM"), or various body controllers such door lock/unlock modules, window motor control modules, seat belt usage sensors and modules, air bag modules, engine start motors and control systems, electric-vehicle motors and motor controllers, trunk lock/unlock modules, infotainment head units, storage components such as hard drives and memory modules, navigation systems, and others. ('ECU' and 'ECM' may be used interchangeably.)

Another type of security device that may be used is remote keyless systems ("RKS") and may be referred to as keyless entry or remote central locking systems. Remote keyless systems fall into the two categories previously described: those that use a one-way transmitter and those that use a transponder system. The most popular systems used are fundamentally "remote access systems." They use a one-way active short-range transmitter, powered by a small battery, and are activated by a button on the key bow or fob attached to the key. When the vehicle operator is within a predetermined range of the vehicle, usually 15-60 feet (typically determined by signal strength of a transmitter of the fob), the button is pushed and the coded signal is transmitted. A receiver within the vehicle receives the coded signal and performs the desired function, typically a door lock, door unlock or trunk open command. The coded signal is encrypted to prevent car thieves from intercepting and spoofing the signal. Some early systems used infrared instead of radio signals to unlock the vehicle. Some cars' engines may be started, windows opened, and sun roof opened or closed by the push of a button on the key bow, or fob, of these systems.

The other RKS system uses an active transponder system. The transponder may have a passive or active receiver coupled with an active transmitter, operated by a small self-contained battery. This system is a proximity system where the transmitter is triggered when the key-like fob is within a certain predetermined range of the vehicle, wherein the predetermined range is typically determined by the signal strength of a signal transmitted from the transmitter. With the proximity-based system, generally the vehicle operator does not need to press a specific button to gain access to unlock the vehicle. The trigger for unlocking the vehicle is a combination of the RKS receiving the proper coded signal along with the touching, or pushing a button on, or operating, the door handle. In addition to the transponder technology contained within the key-like fob, some fobs contain buttons for lock or unlock and trunk access as well as other functions much like the one-way fobs described in the previous paragraph.

Although the operation of the RF based security keys is not completely foolproof, most vehicles typically use two unique keys/information, respectively corresponding to the set of two keys, fobs, or other similar security devices, typically provided by the manufacturer at the time of purchase, regardless of whether the systems use passive or active systems.

The specific desire of the vehicle manufacturer and the telematics service provider (sometimes the same entity) is to enable the vehicle owner or operator to access and utilize customer-centric services without compromising the privacy or security of the owner/operator or vehicle. This preferably is accomplished by enabling service access only to the owner/operator and excluding other parties not entitled to access the service or data captured and communicated by a vehicle processing device coupled to a communication bus of a vehicle, such as a telematics control unit, or other long range vehicle processing device, coupled to a CAN bus of a vehicle.

A vehicle manufacturer or a telematics service provider desire to enable service when a new-vehicle owner purchases the vehicle and to automatically, in the eyes of the vehicle manufacturer and the telematics service provider, transfer service to subsequent owners when the vehicle ownership is transferred to new owners without human intervention by the vehicle manufacturer, dealer, or telematics services provider.

Further, it is the desire of the vehicle manufacturer and the TSP to re-enable service for a second or subsequent owner without significant human intervention regardless of whether the previous owner has terminated telematics service at a time prior to selling the vehicle.

Turning now to the figures, FIG. 1 illustrates process 100 for SIM card and equipment manufacturing prior to the installation of the TCU into the vehicle. An automobile manufacturer develops a forecast for telematics hardware to be installed into the vehicles assembled and offered for sale, said vehicles including vehicle processing devices for providing telematics services. Although this process specifically defines a process involving a new vehicle, it is easy to see by one skilled in the art, that this process can be applied to aftermarket equipment installed outside of the original equipment manufacturing plant. At step 105 of process 100, the auto manufacturer delivers a forecast for SIM requirements to a designated wireless carrier. Since SIM cards are specific to the designated wireless carrier, at least for initial long-range wireless service, and in principle are owned by that wireless carrier, the wireless carrier prepares an IMSI list at step 115 for the SIM card manufacturer.

At step 120, SIM cards are manufactured, coded and delivered to the telematics equipment manufacturer. When the SIM cards are delivered, secret data uniquely corresponding to each of the specific SIM cards that were delivered to the telematics equipment manufacturer, is delivered directly, securely, and only to the wireless carrier at step 125. At step 130, the wireless carrier provisions the SIM card including the secret data, into the HLR or HSS. The HLR or HSS acts as the SIM subscription database and either of them are the specific network element that stores the SIM card credentials and authenticate and validate operation of the mobile device containing the SIM card. This step must be carried out sometime before the expectation of wireless network service.

At step 140 of process 100, the telematics equipment manufacturer installs the SIM card into the completed TCU. It should be recognized that SIM cards come in many sizes and some are designed for soldering directly to the printed circuit board inside of the TCU. This process globally applies to whatever SIM card solution is designated including "soft SIM" or software based subscriber information that might be used in place of the physical SIM device. Once the manufacturing of the TCU is complete, the hardware equipment manufacturer ships the completed telematics control unit containing the SIM card to the automobile manufacturing plant at step 150. At step 160, the hardware equipment manufacturer securely sends TCU equipment identification information and credentials to the telematics service provider or to the automobile manufacturer. This TCU information provided at this stage might include a specific electronic unit ID, physical serial number, mobile equipment ID, electronic serial number, IMSI, ICCID, pre-shared security keys for application encryption, and any other specific data required for an equipped car to receive telematics service. This information can be delivered directly to a telematics service provider or it can be delivered to the automobile manufacturer for subsequent delivery to a TSP depending on the planned region of sale and operation. Information delivered to the automobile manufacturer is forwarded to the TSP so that the TSP may have all necessary information for offering the service. Sometimes the automobile manufacturer is also the TSP.

Turning now to FIG. 2, step 210 illustrated in method 200 refers to the step of an automobile manufacturer assembling the TCU received in step 150 above into a vehicle as it travels down an assembly line. Conversely, it is possible for the TCU to be installed later in the assembly and delivery process—the TCU may be installed into a vehicle any time up until the customer takes delivery or ownership of the vehicle. (In an aftermarket installation this may occur after a vehicle owner takes delivery or ownership.) A TCU may be installed in a vehicle transportation center or vehicle preparation center, or at the port of entry for a specific market, at an importer's preparation center, at a distributor's preparation center, or at the retail dealer's sales location or any other convenient location. After the TCU is installed into the vehicle, or at least designated as being associated with the vehicle, unique device identifying information corresponding to the TCU device is sent at step 215 to a designated TSP along with the VIN of the vehicle into which the hardware TCU device was installed at step 210.

Turning now to FIG. 3, the figure illustrates method 300. At step 305, the TSP creates a database merging information received from a vehicle manufacturer, vehicle seller, aftermarket TCU device seller, etc. that corresponds to the vehicle's VIN. This information merged at step 305 may include SIM card information, and may include technical parameter data as well as unique identifiers and security information such as unique keys or codes corresponding to unique security devices such as keys or fobs, TCU hardware information (such as serial number, MAC address, or addresses, model number, manufacturer(s), etc.), vehicle information corresponding to the vehicle's VIN (such as vehicle equipment and component information) if the VIN has been received. The VIN confers vehicle-specific information to the TSP. Although VIN is not necessary to provide basic safety and security telematics services, it could define the secondary services or equipment on the vehicle. For vehicles that don't deliver safety and security services, it could also provide vehicle parameter information like charging times and/or warm-up or cool-down climate pre-condition times. The information could specify many other options that are part of the remote-control system of the telematics service like the navigation system details or number of points a navigation system may remotely accept.

At step 310, the auto retailer or customer calls the TSP to activate service using the VIN or other vehicle identification information. In some telematics service solutions, the vehicle may have a pre-activated wireless network connection and the call can be completed using the in-cabin service request button, while in other vehicles, this call may be handled on a landline or other cell phone. For vehicles that don't include voice services, the call is typically handled on a second telephone, whether or not the vehicle wireless service has been activated prior to customer delivery. Typically, at step 315 the TSP will activate billing for service from a long-range wireless carrier, or the TSP will activate the wireless service and the billing. In some scenarios, long range wireless network carriers/operators have technology that automatically starts billing for pre-provisioned and activated long range wireless devices, or modules, once the long range wireless device, or module, generates a trigger event, such as attempting to accesses the long range wireless network for voice service, or when it has used a certain amount of data bytes for data services (which may include voice over data services, such as Voice over Internet Protocol ("VoIP").

Turning now to FIG. 4, the figure illustrates method 400, which appears to be similar to method 300 illustrated in FIG. 3. The principle difference between methods 300 and 400 is that in step 420 of process 400, the long rage wireless carrier provisions the SIM card in the HLR or HSS only after the TSP has requested specific service enablement for the device containing the SIM card (e.g., a TCU installed into a vehicle). In methods 300 and 400, billing and the service begin once the TSP contacts the wireless carrier. If a telematics services provider uses process 400, it is not necessary to perform step 130 of process 100 shown in FIG. 1 before the new-vehicle owner takes delivery of the vehicle. Process 400, shown in FIG. 4, is typical of the process currently used by auto manufacturers and TSPs.

Figure 5:
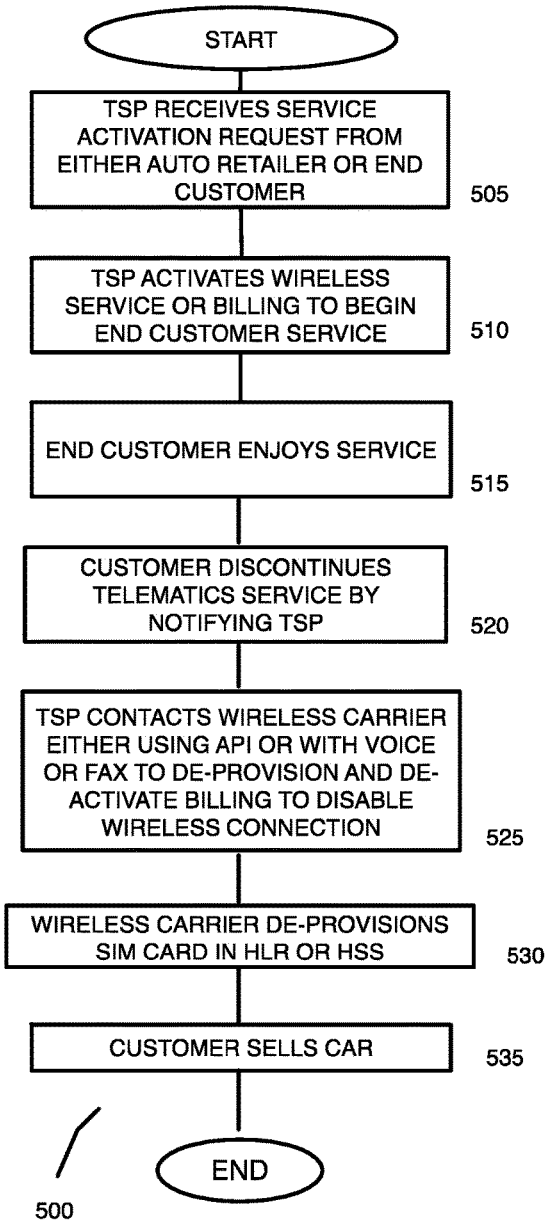
FIG. 5 illustrates a flow diagram of the lifecycle of a perfect telematics customer experience using the current telematics subscription models.

Turning now to FIG. 5, the figure illustrates method 500 that shows steps in a first lifecycle of a telematics device, a telematics equipped car, and a telematics customer. At step 505, the designated TSP receives an activation request from an automobile retailer or the end customer/user. The TSP activates long range wireless service or billing at step 510 to begin end-user telematics services. At step 515, the customer enjoys the service. At step 520, the telematics customer discontinues the service. This might be because he no longer drives the vehicle or it may be because he can no longer afford the service, or because he plans on selling the vehicle. At step 525, when the end customer discontinues service or sometime shortly thereafter, the TSP contacts the long range wireless carrier, either using an electronic API or with a voice call or facsimile to de-provision and deactivate the wireless service and discontinue the billing, thus disabling the wireless connection to the vehicle. At step 530, the wireless carrier de-provisions the SIM card in the HLR or HSS. At step 535, the customer sells the car to another buyer.

When another buyer purchases the vehicle method 500 may repeat, but iterations of method 500 following the first iteration thereof may give rise to a dilemma that prevents a smooth transition of telematics service to a second or subsequent owner. Once the vehicle is sold, there is typically no database, mechanism, or central authority that notifies the TSP of the vehicle sale. If a prospective telematics customer contacts a TSP in an attempt to begin telematics services as a second or subsequent owner, the TSP cannot verify with acceptable certainty that the would-be telematics customer is a bona fide new owner of the vehicle instead of someone, or something (i.e., an automatically operated, or manually operated, computer hacking system) attempting to extract confidential information from the telematics service regarding the actual bona fide new vehicle owner. The TSP might ask for a bill-of-sale, but there is no state or national standard bill-of-sale form. If the car was purchased with money from a lender, then the title is tied-up as collateral with the lender and it may not be available for disclosure to the TSP. It becomes highly subjective as to whether the sale was real or whether it is a bogus request from someone attempting to extract private and confidential information from the telematics unit.

Figure 6:
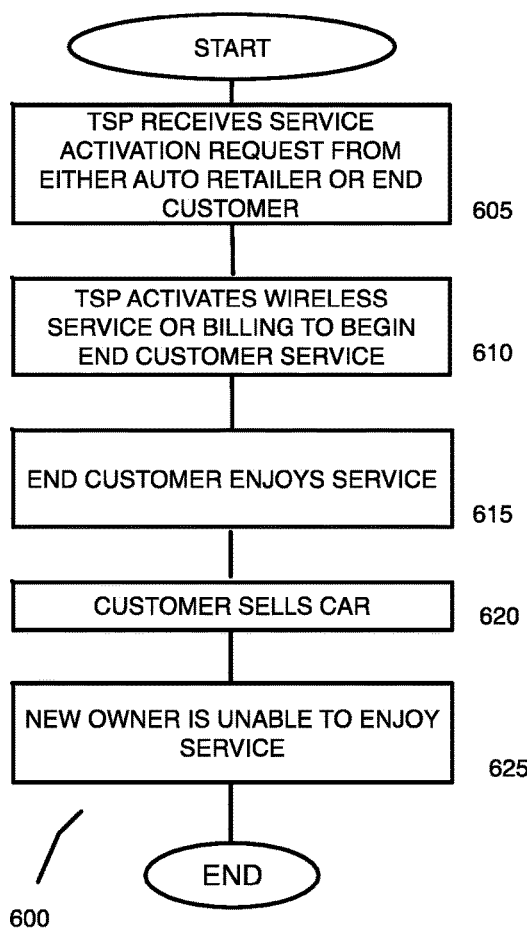
FIG. 6 illustrates a flow diagram of steps that may occur when an original-vehicle-owner and first telematics subscriber sells a car before terminating a telematics service account.

Turning now to FIG. 6, the figure illustrate method 600, which shows steps of another possible termination scenario that may give rise to a dilemma. In this example, the telematics service is activated at step 610 as discussed above. The customer enjoys telematics service at step 615 but decides to sell the vehicle at step 620 before terminating the telematics service. At step 625, the new owner is unable to subscribe to new service and remove access to potentially private and confidential data by the previous owner because the new owner of the vehicle is not the owner of record in the TSP's database. As discussed in the previous paragraph in reference to FIG. 5, the new owner typically cannot prove that he is the bona fide owner of the vehicle and the TSP typically cannot offer service to the new owner unless the TSP has a secure and valid way of reaching the previous owner to verify that he, or she, has sold the vehicle and that his telematics services account should be canceled. Sometimes the second owner may not subscribe to telematics services, or years might pass between sale of the vehicle by the previous owner who subscribed to telematics service and an attempt by the new/current owner to activate telematics service. As mentioned above, there is not a national vehicle registry and there is no standard mechanism or document to certify that the party requesting service is the actual owner of the vehicle.

Figure 7:
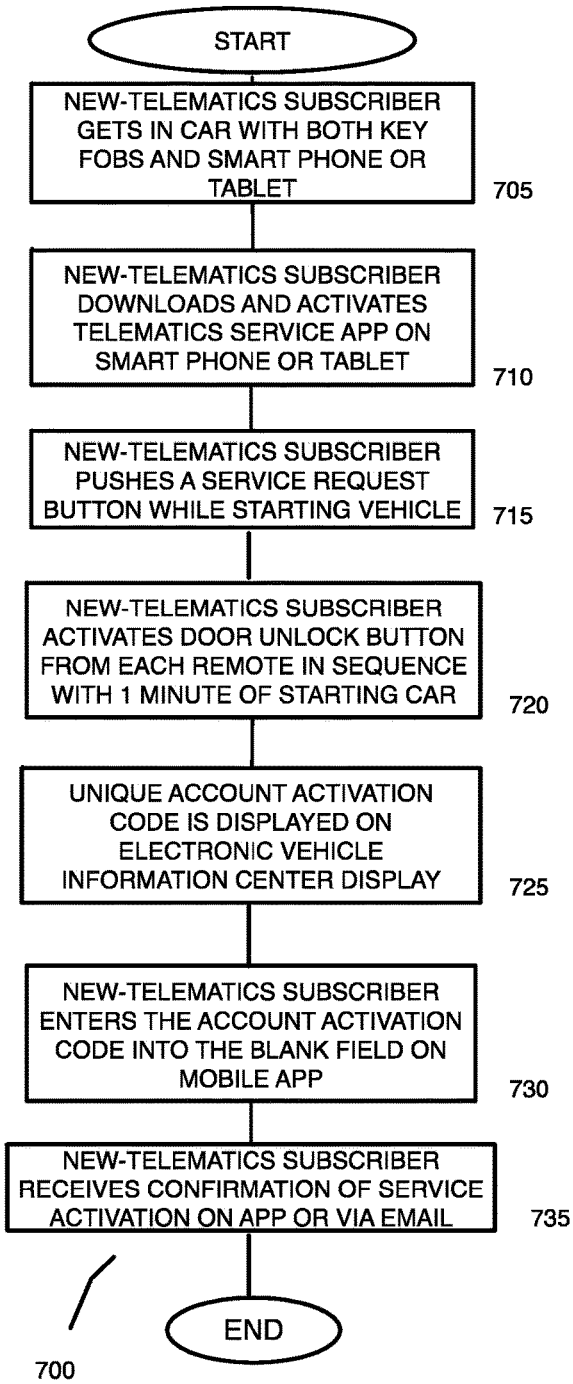
FIG. 7 illustrates a flow diagram as seen from the new-telematics subscriber's perspective, for automatically setting up telematics service without human intervention from telematics services provider personnel.

Turning now to FIG. 7, the figure illustrates method 700, which shows steps that solve the dilemmas discussed above in reference to FIGS. 5 and 6. At step 705, the new-telematics subscriber gets into the car with both first and second security devices, such as smart keys, or fobs, that are typically delivered with the purchase of a vehicle. Regardless of whether the security device/smart key system uses passive smart keys with RFID chips in the bow, one-way remote access key fobs or two-way transponder fobs, the steps of method 700, including the action at step 705, are similar. It will be appreciated that the action at step 705 may include the owner, or his authorized designee, entering the cockpit of the vehicle with the two security devices (i.e., smart keys or fobs). In such a scenario, the cockpit would serve to provide a predetermined range (i.e., the confines of the cockpit) in which the security devices are located at step 705. Other actions taken at step 705 may include placing the first security device within a first predetermined range (i.e., the cabin or cockpit of the vehicle), and placing the second security device within a corresponding second predetermined range (i.e., the confines of the trunk/boot of the vehicle or under the hood/bonnet of the vehicle). In some scenarios, the first and second predetermined ranges are the same (e.g., both first and second security devices are located with the cabin or cockpit of the vehicle).

At step 710, in the preferred embodiment, the new-telematics subscriber downloads an application ("app") on an Internet-connected smart phone or tablet. This app is most likely customized to the type of smart phone or tablet, but instead of a specialized app for a specific operating system like Android or iOS, the initial service setup could be completed on an HTML based web service portal as well. The vehicle purchaser preferably configures certain information in the smart phone app or on the web-based portal before proceeding to step 715. It will be appreciated that the smart phone app may be downloaded and installed before entering the vehicle cabin with the two security devices.

At step 715, the new-telematics subscriber initiates an authentication sequence by pushing a service request button while starting the vehicle. Alternatively, the service request button could be activated before starting or after starting the vehicle. The service request button could be a dedicated physical button for service subscription, it could be a soft button on an infotainment system screen, or it could be a re-purposed button like the emergency calling button, only activated during the vehicle startup. It will be appreciated that there are various mechanisms, procedures, or steps that a manufacturer may have established for triggering a subscription authentication/activation sequence/process. The methods specified are not intended to be limiting or to exclude other methods, but are meant to specify by example, some of the methods that might be used by a typical telematics subscription system, or that may be used to begin a process for associating a user device with a vehicle, wherein the vehicle may be used to control certain aspects or operations of the vehicle. Any method, whether physical/mechanical, or electronic, for generating and communicating a request message signal for triggering the sending of a services request message to the vehicle processing device may be considered a valid initial service request.

After triggering the authentication sequence with the subscription service request start event, at step 720 the new-vehicle purchaser provides proof of presence of each of the first and second security devices, such as electronic smart keys or smart fobs, by performing actions that cause at least first and second authentication trigger events to occur. An authentication trigger event may include, or may cause, the first or second security device to transmit, emit, radiate, or respond to an initiation, a signal that includes information unique to the given security device and that may include secret information such as keys (encryption, decryption, or other unique information that cannot be mimicked). Preferably, the first and second authentication trigger events must occur within configurable predetermined first and second authentication periods, respectively. (The first and second predetermined authentication periods may be the same, or they may be different.) In addition, or alternatively, the first and second authentication trigger events may be required to occur within predetermined first and second authentication ranges, wherein the authentication ranges are typically referenced to a location in, or of, the vehicle, such as within first and second respective predetermined distances of a wi-fi hot spot access point, or merely within a range that sensors/transponders of the vehicle can communication with transponders of the first and second security devices. (The first and second predetermined authentication ranges may be the same, or they may be different.)

The first and second authentication trigger events may occur upon the pushing of a first door lock or unlock button and a second door lock or unlock button on each of the first one-way or two-way fobs and the second one-way or two-way fobs, respectively. Other actions that may cause the occurrence of first and second authentication trigger events may include: respectively starting the vehicle with each of the first and second passive transponder keys, holding each of the first and second passive transponder keys near the ignition lock, one after the other or simultaneously, or the mere presence of the first and second two-way fobs in or within a radio frequency ("RF") 'bubble' (i.e., a predetermined range) around the car in which transponders of the vehicle may communication with, and recognize, the keys.

Following step 720, when the ECU or other RKS or telematics system component determines that an expected authentication service request sequence, including the transmitting of first and second unique information by, and corresponding to, first and second security devices, respectively, following first and second authentication trigger events, as having occurred within first and second predetermined ranges, respectively, and within first and second predetermined authentication periods respectively, wherein the first and second predetermined authentication periods commence upon the occurrence of the first and second predetermined authentication trigger events, respectively, the ECU or other RKS or telematics system component, or similar such component, preferably sends at step 725 an electronic message to an in-vehicle display so that information contained in, or relative to, the message can be viewed by the new-telematics subscriber. This displayed electronic message may be alphanumeric, alphabetic, numeric, bar code, QR code, human readable only, machine readable only, or any combination thereof. The information conveyed might be unique based on the date and time of day. The conveyed information might be unique to the particular vehicle, or it may be unique based upon other parameters, either permanent or temporary or changing, as long as this code can be determined to be a genuine code generated by a specific vehicle that is the target of a subscription pairing/associating and enrollment request.

At step 730, a QR code containing several required service elements may be generated by the vehicle processing device and displayed on a vehicle infotainment display of the vehicle. This QR code could contain, optimally the IMSI or ICCID of the SIM card for wireless communications, the VIN, and a services-granted activation code. The services-granted activation code may be used as, or as part of, an authentication acknowledgement message that the first unique information corresponding to the first security device was transmitted within the first predetermined range of the vehicle during the first predetermined authentication period, and that that the second unique information corresponding to the second security device was transmitted within the second predetermined range of the vehicle during the second predetermined authentication period. Optimally the mobile app that the user downloaded and installed at step 710 could scan the QR code and automatically enter the vehicle specific information for telematics service activation. (Alternatively, the app downloaded at step 710 may retrieve information associated with the scanned QR code from an existing QR code/bar code scanner that the user may download and install geographically and temporally separately from the performance of step 710.)

Typically, two items precede an activation transaction that occurs after confirmation or receipt of the acknowledgement that an activation code indicates that requested services are to be granted: The identification of the specific vehicle and the activation code acknowledgement are conveyed to the telematics service provider to initiate the subscription service request and activation. The VIN code or some other unique vehicle identifier may be used to identify a specific group of associated data pre-populated in the TSP's database, similar to the activity represented in step 305 in FIG. 3. Another method is to present a series of numbers that the new-telematics customer must manually enter into an HTML (or similar) based web site with a PC or mobile application. These techniques would not require human intervention at the central telematics computer server. Additionally, it is possible to follow through the entire process without any PC or mobile device enablement by placing a phone call to a call center representative and speaking the VIN or vehicle identification codes and authentication codes.

Upon activation of the user's new account following satisfactory completion of steps 715-730, the new-telematics subscriber receives a message that confirms subscription to telematics services for the vehicle. Additionally, at this step it is possible to provide a number of other notifications. If this is a second (or later) pairing/associating attempt, (which may occur as the result of multiple sale transaction related to the vehicle) at step 735, the application may ask if this is the base subscription or if this is a second or other driver subscription for the existing base account. If this is a new base account, at step 735, a previous telematics subscriber may receive a notification that the service has been discontinued. If this is a second or later driver to an existing base subscription, then the base subscriber could receive notification. The notification could be with push messaging, SMS, email, a telephone call, or a standard postal letter notification or any other future notification method. The base subscriber could ideally be asked if the second driver request for service is genuine and acceptable before the second driver has access to confidential information and before the second driver is able to remotely control features in or on the vehicle.

It should be recognized that although the preferred embodiment uses a smart phone application, other techniques may be used with the technique of authenticating by substantially simultaneously presenting possession of two smart keys, fobs, or other security devices within a vehicle while performing a services activation process that includes performing predetermined steps inside the vehicle that trigger an authentication and activation process. Various possibilities of demonstrating possession of both fobs may be used. One possible method might be using a unique printed indicator on the fob, perhaps a printed serial number or electronically readable bar code or other unique identifier, either directly machine readable or human readable. Another possible technique is to photograph the set of fobs together with human readable serial numbers. The fobs transmitting a signal that could be received by a smart phone or tablet, perhaps Bluetooth or Bluetooth Low Energy, directly to the smart phone or tablet, may satisfy the possession of the two different security devices requirement—the possession of both fobs, or other type of security device, is a very strong indicator of ownership of the vehicle by the requestor of telematics services. Possession of a single fob does not convey the rights necessary to establish a new telematics subscription. In addition, using human readable indicators is possible but less secure than having the presence of two security devices with respective predetermined ranges and within respective predetermined authentication periods.

Depending on the requirements of the automobile manufacturer and the TSP, the billing arrangements, and the legal terms of service, the prospective subscriber may have to provide legal contact information, including home address and phone numbers, email address, cell phone numbers and the prospective customer may have to electronically agree to liability limitations for the terms of service, presented electronically, and provide an arrangement for billing to compensate the auto manufacturer/TSP for service. All of these items can be completed on a typical PC, smart phone, or tablet operating on the different operating systems available.

Turning now to FIG. 8, the subscription set-up steps of method 800 are similar to those of method 700. However, method 800 includes several modifications to facilitate less complex vehicle displays and to reduce opportunities for customer mistakes. At step at 805 a prospective new-telematics subscriber enters a vehicle for which a subscription for telematics services is desired with both key fobs, or other similar security devices, and the new-telematics subscriber has access to an Internet connected smart phone or tablet. The prospective new-telematics subscriber downloads a telematics app onto the smart phone or tablet and completes preliminary subscription steps in the app or on a portal at a web site at step 810. As before, these steps could include providing name and contact information, agreeing to terms of service, and entering payment information.

Once the basic new-telematics customer information is completed, the mobile application prompts the customer, shown at step 815, to scan an identification QR code label affixed to the vehicle. This QR code label to be scanned can be affixed to any place on the vehicle, preferably where it does not detract from the vehicle's appearance. It may be on a vehicle door pillar, visible only when the door is open or inside the trunk lid or similar location. The QR code can provide information including the VIN, IMSI and other authentication information necessary for a preliminary subscription. Example QR codes are shown in FIGS. 13 and 14. FIG. 14 shows a typical permanent QR code that might be affixed to the door pillar or inside the trunk lid, where it is accessible for the pairing process, but outside of the normal visible locations where it will not detract from the look and styling of the vehicle. Since it is still necessary to accompany the QR code of FIG. 14 with authentication data to prove the possession of two smart keys or other security devices, easily-viewed placement of the QR code is not a concern.

As compared to the QR code in FIG. 14, FIG. 13 shows an additional element contained within the QR code that appears on a display of the vehicle after a determination that the user requesting new telematics services has possession of first and second security devices during the activation process taking place within, or near to, the vehicle. That additional element is the activation code. The activation code is a code that validates possession of both smart keys, or fobs within the proximity of the vehicle during the subscription process. The activation code can be a fixed alphanumeric value, unique to the specific vehicle, that is displayed on the infotainment display vehicle only during the subscription process, or ideally it can be a cryptographic hash value, preferably created as a result of hashing the VIN with the current date, as received from a GPS module in communication with the vehicle processing device, or some other variable information and some other data unknown to anyone other than the system developers. The services provider's server, or a user device to be associated with the vehicle, may, or may not, try to match the activation code it receives by separately performing the same algorithm on the same information that the vehicle processing device used to generate the activation code. (As discussed above, the TSP, or vehicle manufacturer, typically maintains a database that associates the unique information corresponding to a vehicle's unique first and second security devices with the vehicle's VIN.)

Hash values are created by cryptographic hash functions that can be used to map digital data of arbitrary length into deterministic digital data results. There are many cryptographic hashing algorithms that may be used to insure the integrity of transmitted data and provide message authentication. Examples of common hash functions are MD5, SHA1, SHA2 and SHA3. This list is meant to exemplify the hash function and not intended to limit the possible hash algorithms that may be used. As stated previously, the response authentication code is not critical. It might even be a preloaded random number known only by the auto manufacturer and the TSP.

At step 820, the new-telematics customer presses the service request button to initiate an authentication/activation sequence. The new-telematics customer typically follows a similar procedure as those described in reference to step 715 of FIG. 7. At step 825, the new-telematics customer proves the presence of each smart key or fob similar to the procedure described above in reference to FIG. 7. The customer may have to press a button on each fob, or he may have to start the car with each security device, or he may only have to possess both remotes inside the vehicle.

Continuing with discussion of FIG. 8, upon submission of proof of the presence of both first and second smart keys (first and second security devices) at step 825, at step 830 the in-vehicle electronic information center displays a unique account activation code. The activation code may be of any form as described above, but it is transferred either manually or electronically to the mobile application running on an Internet connected smart phone or tablet as referenced in the box representing step 835. At step 840, the new-telematics customer receives a confirmation of service activation and a previous subscriber receives a notification of subscription termination. If this is a new base account, at step 840, the previous telematics subscriber may receive a notification that the service has been discontinued. If this is a second or later driver to a base subscription, then the base subscriber could receive notification. The notification could be with push messaging, SMS, email, a telephone call, or a standard postal letter notification or any other future notification method. The base subscriber could ideally be asked if the second driver request for service is genuine and acceptable before the second driver has access to confidential information and before the second driver is able to remotely control features in or on the vehicle.

Turning to FIG. 9, method 900 shows steps by the telematics service provider's servers. These actions described are shown as an example and it should be apparent that the illustrated flow could be modified and still accomplish the same task. In step 905, a server connected to a communications network, receives a request for activation of one or more long-range-wireless-communication-based services for the vehicle, such as telematics services that a TSP may provide over a long-range wireless carrier's wireless communication network. The communications network that connects to the server can be any type of network, such as a public Internet or a private dedicated network managed by a specific wireless network operator or any other type of network capable of passing digital information. The server receives the request from the end customer that includes at least the vehicle identity and a vehicle unique activation code. This information can be communicated along with other telematics-service related information such as customer name, address, acceptance of terms of service, payment information, contact information, phone numbers, email addresses and or any other information the telematics service provider deems necessary for providing telematics service to the prospective customer.

Prior to proceeding to step 910, the TSP can make decisions such as whether the equipment installed in the vehicle supports wireless connectivity. For example, the equipment could contain a 2G-network communications module and the minimum that the wireless network provider accepts is a 3G-network communications module. This decision can be based on information manually entered in the mobile app or it can be based on the IMSI or some other element passed via the electronic service request. If the vehicle's hardware supports the requested services and the customer has accepted the terms-of-service and the payment information (as required by the provider), and meets the standards for service, the TSP can send an activation request to the wireless operator to begin long range wireless service to a vehicle processing device coupled to a communication bus of a vehicle. In some previously described scenarios, the activation request does nothing more than start billing for a previously provisioned and activated device. Alternately, this activation request can move a dormant set of SIM card credentials into the HLR or HSS wireless network elements/equipment to validate and authenticate the wireless network access device contained in the telematics control unit. It will be appreciated that the activation request from the TSP to the wireless carrier's equipment should not be confused with an activation code, or an authentication acknowledgement corresponding to it, that is generated by possessing first and second security devices within first and second predetermined ranges and within first and second predetermined authentication periods that commence upon first and second predetermined authentication trigger events, wherein the trigger events may be the same event, and may be part of an authentication sequence.

The credentials required for long range wireless service are programmed into a SIM card, as previously described in process 100, step 120. The credentials, as previously disclosed at step 125, are directly and securely transferred to the designated wireless network operator. One option for the wireless network operator, and the current preferred method of operation is to immediately provision the SIM card credentials into an HLR or HSS. This step is performed at some time before the TCU containing the wireless network access device can register on, and use, the long-range wireless network. As previously discussed, this process of pre-enabling an "access ready" device creates a smooth transition to service. The billing for the wireless service may be delayed until such time as the TCU makes an actual attempt at accessing the network. Maintaining SIM card credentials has a cost that must be absorbed by some entity, typically either the wireless carrier, the TSP, or the auto manufacturer.

Alternatively, aspects disclosed herein allow the vehicle processing device coupled to a communication bus of a vehicle to be provisioned into the HLR or HSS at the immediate time of service request without preloading the SIM card credentials directly into a wireless carrier's HLR or HSS before telematics services are requested by an authenticated user. The credentials could be stored off-line in a lower cost database until the time of the telematics service request by the new-telematics subscriber. The significant advantage of this solution is that over time millions of vehicles may be equipped with TCUs to provide telematics service and each of these TCUs will contain a SIM card that may not be user replaceable. The credentials for each of those SIM cards must be maintained until the end of the vehicle life or the vehicle processing device coupled to a communication bus of a vehicle would have to be replaced to reactivate service. During its lifetime, a vehicle may be bought and sold several times and telematics service may be turned on and off at various times. Automatically managing information specific to the SIM and the wireless service will provide a significant advantage vis-a-vis the current model of having a vehicle's telematics equipment provisioned for wireless service the day it rolls out of its manufacturing facility because telematics services may not be requested for months or years, if ever for a given vehicle.

Continuing with the description of FIG. 9, after the wireless service is activated or the billing is started on the wireless account at step 910, the subscriber can enjoy telematics service as noted in step 915. If the customer sells the car while subscribing to telematics service as shown in step 920, the second or subsequent owner can easily start the activation process 800 (or 700) to establish service. At the time the second or subsequent potential-telematics customer completes step 835 of process 800 (or corresponding step 730 in FIG. 7), the TSP receives an activation request for telematics service as shown in step 925 of process 900. At this point, the TSP electronically notifies the old telematics customer of the change using one of push notification, email, SMS, telephone, or traditional physical mail to alert the old telematics customer that somebody new will be receiving telematics information from the vehicle that was previously attached to an existing telematics customer's account. At step 930, the TSP can remove the existing telematics customer's access rights to the vehicle previously associated with the old owner/operator. At step 930, the new-owner/operator becomes the account holder with access rights to the specific telematics-equipped vehicle and the associated data.

Figure 10:
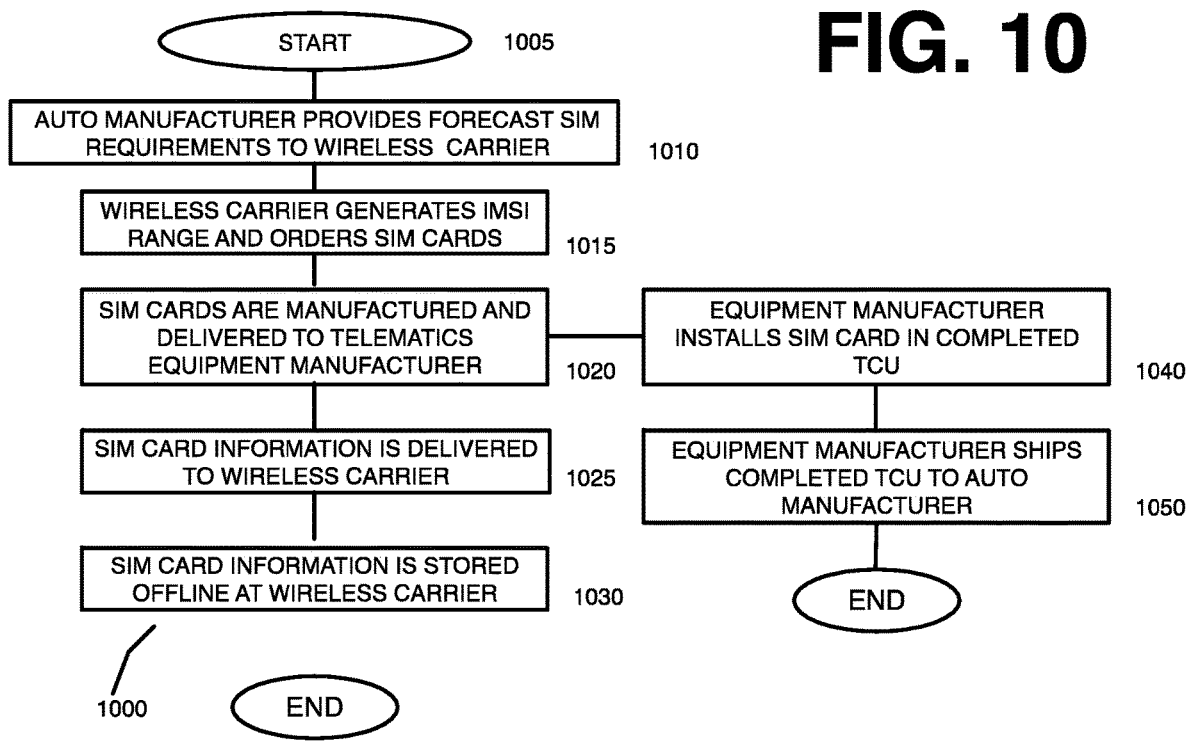
FIG. 10 illustrates a flow diagram of a process of manufacturing and distributing SIMs to a telematics device manufacturer and to a long-range wireless communication service provider.
Figure 11:
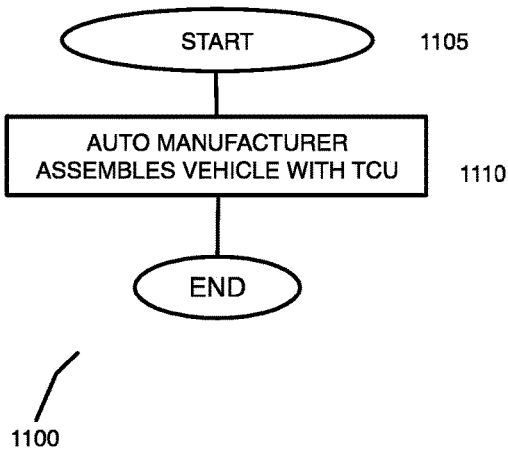
FIG. 11 illustrates a diagram of a vehicle manufacturer manufacturing a vehicle with a TCU in the vehicle.
Figure 12:
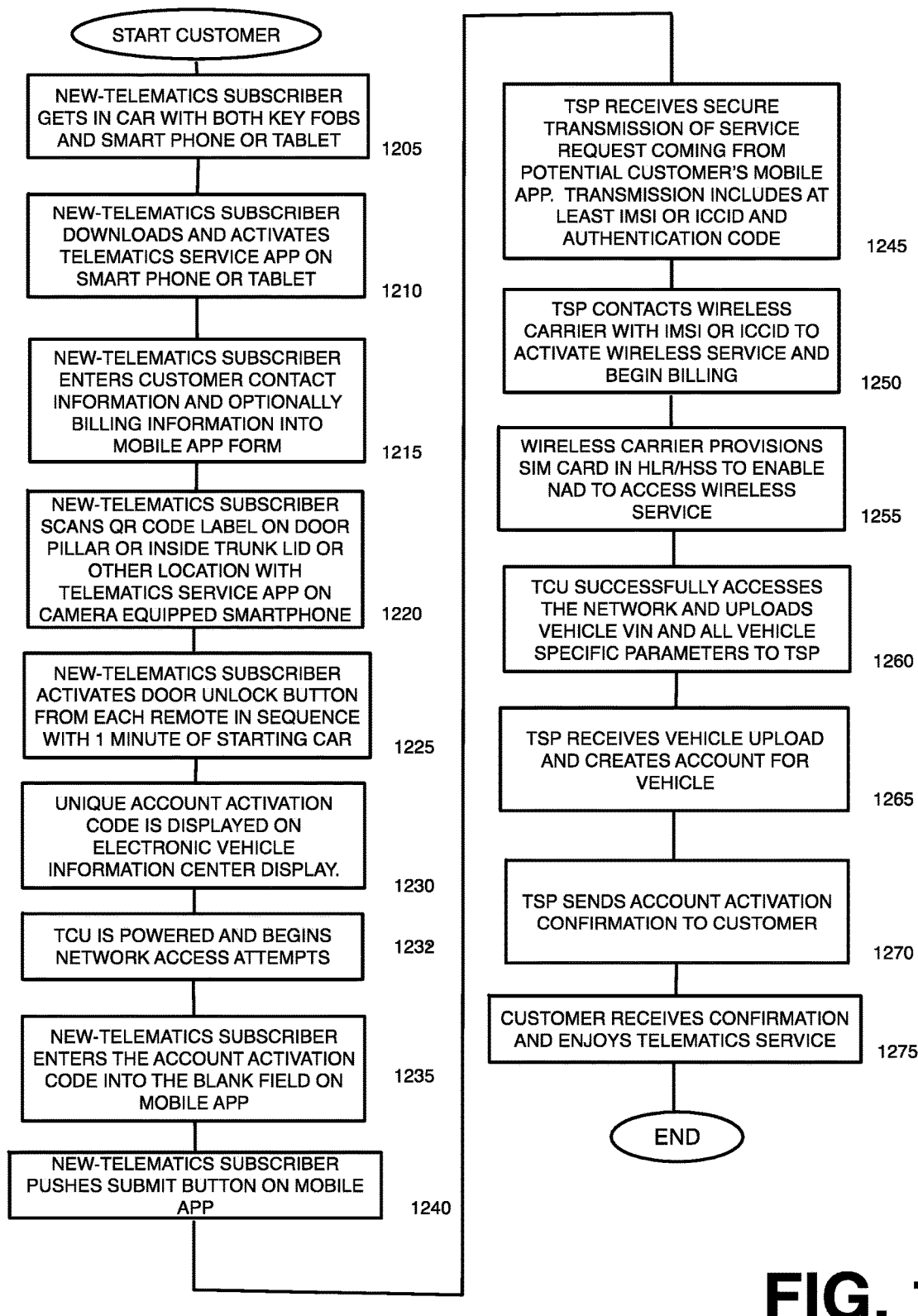
FIG. 12 illustrates a diagram of a new-vehicle-owner initiating establishment of a new telematics service subscription by having first and second security devices present in a vehicle during a predetermined period. The diagram includes illustration of steps performed automatically by a telematics services provider's server following the new-vehicle-owner initiating establishment of the new telematics service subscription.

An optimal preferred solution is presented in FIGS. 10-12. This solution begins very similarly to the previously described process 100 although unlike FIG. 1, method 1000 shown in FIG. 10 has no data communicated from the hardware manufacturer or the auto manufacturer directly to the TSP. Rather, communications are conducted through other paths and channels. The hardware manufacturer installs the SIM cards into the TCUs and ships the completed TCUs to the auto manufacturing assembly location. During the auto assembly process the vehicle manufacturer installs the TCU into given vehicles using processes known and understood by the industry, and it is not necessary to treat a connected TCU any differently than any other electronic control unit installed in the vehicle, as shown in FIG. 11.

Turning now to FIG. 12, once the assembled vehicle is delivered to the purchaser, the purchaser can follow a simple and secure process to subscribe to telematics service in conjunction with the newly purchased vehicle. As noted in step 1205 of process 1200, the potential telematics subscriber will again his vehicle with both key fobs. The potential subscriber will download a specific telematics service app on his Internet connected smart phone or tablet. He will enter his customer contact information and if required for service, billing information, into a form on the mobile app. The billing information would most likely be a credit card number, security code, and expiration date, but the TSP could ask only for a billing address for sending a paper bill with payment made at a later date. It is also possible that the customer does not need to provide billing information because the service is completely pre-paid by the auto manufacturer, or the payment was included in the price of the vehicle purchase.

At step 1215, if the auto manufacturer requires acceptance of terms of service, the presentation of those terms and the acceptance of those terms by the prospective subscriber could be completed. The subscriber could optionally ask that the terms-of-service also be emailed to a previously entered email address.

Steps 1220, 1225, and 1230 can be managed in several different ways with neither way being preferred over the other. Although it is necessary to demonstrate possession of both of the smart keys, or fobs, this step could be done prior to scanning the QR or bar code or after scanning the QR code. Ideally, if the possession of the keys are authenticated before the QR code is scanned, a QR code display could be presented on the infotainment head unit, instead of a preprinted label attached to a door pillar or under the trunk lid, that contained all the necessary vehicle specific subscription information such as IMSI, VIN, TCU ID, security codes, vehicle equipment and the QR code could also contain the complete unique account activation code as shown if FIG. 13. Using this method eliminates step 1235, but it uses an infotainment head unit with an output display resolution to optimally support a Version 10 (57×57) QR code. Some vehicles may not have such a dense resolution, but this provides the optimal amount, 174 characters, of information on a single scan. It is certainly possible to use lower resolution QR codes or bar codes, but multiple scans might be necessary which might complicate the subscription process for the end-user. After the demonstration of possession of two smart keys during a predetermined authentication period within a predetermined range of the vehicle, as described above in connection with FIGS. 7, 8, and 9, the TCU could activate power to the network access device inside the TCU and the network access device could begin its attempts to establish a wireless connection to the TSP's TOC. After entering all the information and/or capturing all the scans, the prospective customer would push a soft button on the smart phone to submit the request for service.

Turning to the second half of the process 1200, the TSP server receives the submission for service activation from the vehicle processing device at step 1245. In this aspect, the TSP typically must receive the IMSI or ICCID of the vehicle processing device, or at least a wireless module device coupled to the vehicle processing device, to facilitate the wireless network SIM provisioning. The TSP also preferably needs to receive the unique vehicle-specific authentication code generated at step 1230 that certifies that the vehicle processing device has determined that two security devices were presented inside the vehicle, or within a predetermined close range, or ranges, (typically the range, or ranges, that signals transmitted, emitted, or otherwise provided in a response can be detected by the vehicle processing device or wireless devices in communication with it) during a predetermined authentication period, or periods, to confirm that an authorized owner or user of the vehicle was the person who performed steps 1205-1225. Other information from the vehicle can be communicated directly and electronically at step 1260 by using the vehicle processing device, such as a TCU, communication channel after wireless service is established. At step 1250, the TSP typically will contact the wireless carrier using a predefined API to request provisioning of the SIM card, information with which was communicated by the vehicle processing device and received by the TSP server at step 1245. Because of industry standard SIM manufacturing processes, the wireless carrier has typically already received the SIM card credentials and stored them offline within secure servers owned and operated by the wireless carrier, as noted at step 1030 of process 1000. At step 1255, the wireless carrier enables wireless connectivity and billing begins for the wireless account. After wireless connectivity becomes available, the vehicle processing device, such as a TCU, may connect to a telematics server operated by the specific TSP and may begin to upload vehicle-specific parameters as shown in step 1260.

One element of the process, not shown in the process flow, but certainly a desirable option, is a step where the vehicle processing device, such as a TCU, first contacts the auto manufacturer's TSP assignment center. The TSP assignment center will provide the selected TSP URL, IP, or other web connection address to facilitate multiple TSPs across multiple regions. One consideration might be to offer the new user/customer the ability to select the set of services the user desires and/or possibly select a provider based upon a competitive price offering. The TSPs may be differentiated by region of operation, services or any other factor. If a TSP assignment center is used, the mobile app could query the TSP assignment center to determine a preferred telematics services provider before sending subscription data to a selected services provider at step 1240. After the TSP selection is made and the address is established the vehicle processing device/TCU can contact the targeted TSP for the next step of the process.

At step 1260 and 1265, the vehicle processing device/TCU uploads vehicle-specific parameters to the TSP and the TSP establishes and builds an account for the new customer. After completion of the setup steps, the TSP may send an account activation confirmation directly to the customer at step 1270. Optimally from start to finish, this process can be automatically completed without human intervention within a matter of minutes. Once the customer receives confirmation of telematics service, he may now enjoy a vehicle lifetime of telematics service at step 1275, knowing that no one else has access to his private data and his account without his knowledge and permission.

Figure 15:
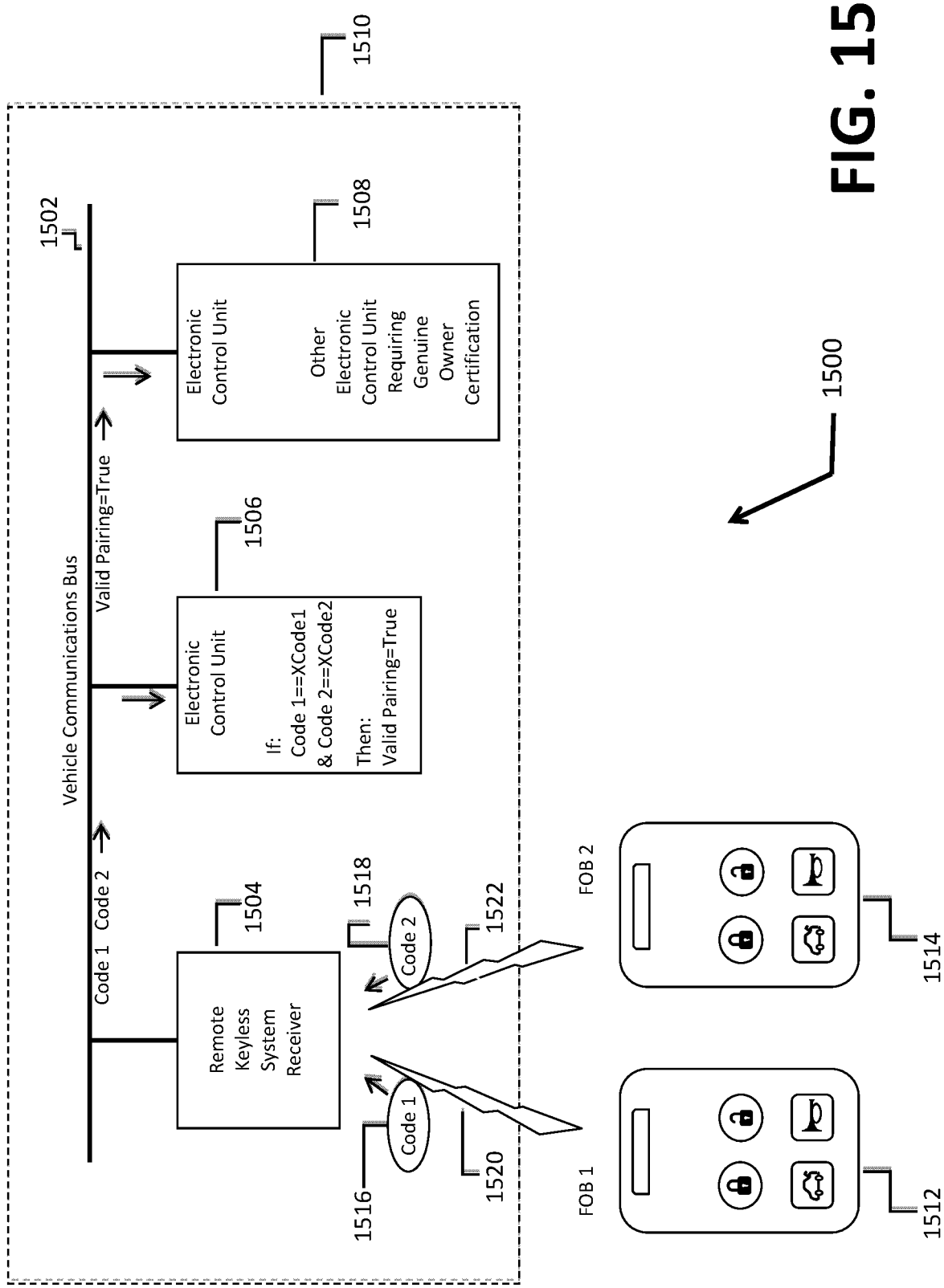
FIG. 15 illustrates a system for automatically authenticating a user to a vehicle, or to a vehicle processing device of the vehicle.

Turning now to FIG. 15, the figure illustrates system 1500 for automatically authenticating a user to a vehicle, or to a vehicle processing device of the vehicle. System 1500 shows a communication bus 1502 of a vehicle with various components or modules connected, or coupled, thereto. Remote keyless system receiver 1504 at least can receive radio frequency signals from security devices associated with the vehicle. Receiver 1504 may also be configured to transmit information in radio frequency signals. Electronic control unit 1506 is a vehicle processing device that can process various messages and signals that may be received by receiver 15004. Electronic control unit 1506 may be part of the vehicle's main electronic control module that also processes engine management messages and signals and is generally the main 'brain' of the vehicle. However, electronic control unit 1506 is preferably part of a telematics control unit that delivers services that an owner of the vehicle may wish to obtain, typically according to a subscription that delivers services wirelessly to the vehicle.

Electronic control unit 1508 refers to another control unit apart from unit 1506. In the example where separate control units 1506 and 1508 are used, unit 1506 may be configured to perform authentication and unit 1508 may be configured to provide more sensitive information; for example, unit 1508 may refer to the vehicle's main brain as discussed above. An electronic control unit may refer to a processor unit of a telematics control unit. Finally, receiver 1504, electronic control unit 1506, and electronic control unit 1508 may compose, or make up, vehicle processing device 1510. As referred to herein, the term vehicle processing device may refer to each of receiver 1504, electronic control unit 1504 and electronic control unit 1508 separately, as subgroups of any of them, or grouped together and part of a single device as shown by the dashed lines representing vehicle processing device 1510.

Regardless of how receiver 1504, control unit 1506, and control unit 1508 are, or are not, grouped together, the receiver typically is configured to receive electrical signals transmitted, emitted, or otherwise provided by first security device 1512 and second security device 1514. Each of first security device 1512 and second security device 1514 typically contains first unique information 1516 and second unique information 1518 corresponding to the first security device and the second security device, respectively, wherein the first unique information is unique to the first security device and different from the second unique information, which is unique to the second security device and different from the first unique information. Receiver 1504 receives security signals 1520 and 1522 that contain first unique information 1516 from first security device 1512 and second unique information from second security device 1514, respectively.

After receiving first security signal 1520 and second security signal 1522, receiver 1504 provides first unique information 1516 and second security information 1518 to bus 1502 for use by devices coupled thereto. (It will be appreciated that communication bus 1502 may be a wired, or wireless communication, bus.) As discussed above, if vehicle processing device 1506 determines that receiver 1504 received first security signal 1520 and second security signal 1522 from within a predetermined range (typically if receiver can receive the first and second security signal, the first security device 1512 and second security device 1514 security devices are deemed by control unit 1506 to be within the predetermined range), and that the security signals were received with a predetermined period following one, or more, authentication trigger events, then unit 1506 will typically determine that a request to perform a requested task or activity should be granted; such tasks, or activities, including, for example, activating a telematics subscription, or pairing/associating a separate user device with the vehicle for purposes of accessing, controlling, or making a payment in connection with, the vehicle. In addition to automatically activating a telematics subscription, examples of sensitive actions that an owner of might want to make sure only he can access or control include: Performing a vehicle operation such as steering, braking, acceleration, unlocking a door, locking a door, operating the vehicle's HVAC system, raising or lowering a window, retrieving stored performance data or diagnostic trouble code information, or making a payment with a payment device associated with the vehicle, etc.

Figure 16:
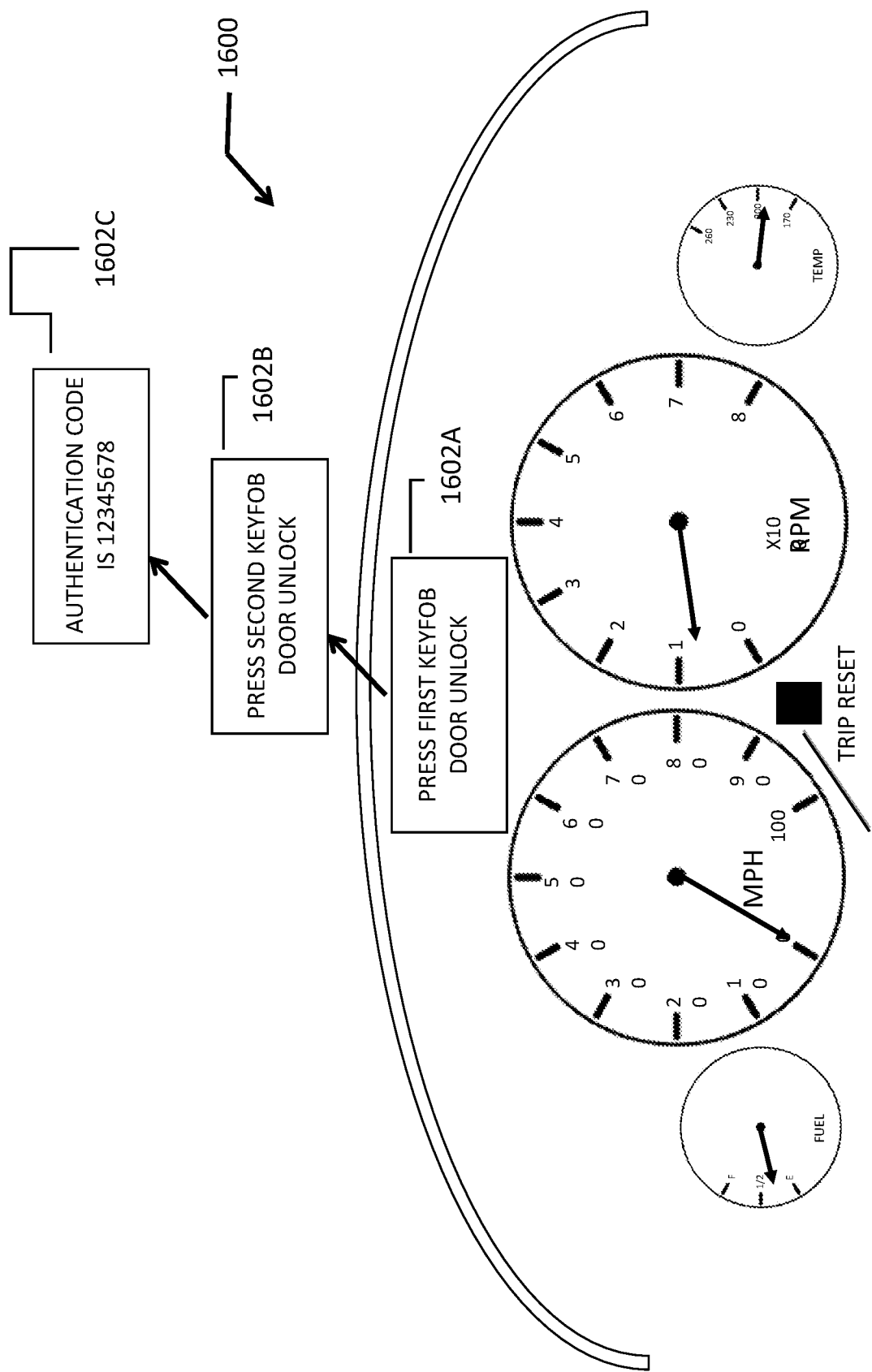
FIG. 16 illustrates a vehicle dashboard layout with an electronic vehicle information center display.

Turning now to FIG. 16, the figure illustrates a dashboard layout 1600 of a typical car's instrument panel. Dashboard 1600 includes electronic vehicle information center ("EVIC") 1602 and trip reset button 1604. EVIC 1602 is typically coupled to bus 1502 shown in FIG. 15 and may be configured to display message that are generated by control units/processing devices coupled to the bus. In a typical scenario to initiate authentication of a user or a user's device, either for purposes of activating a telematics services account for the user, or for purposes of pairing/associating the user's device or devices, such as a smart phone or tablet, with one or more devices coupled to bus 1502, the user may press the trip reset button while pressing the vehicle start button a predetermined number of times. This sequence of holding trip reset button while pressing the vehicle start button three times is given only for purposes of illustrating one of many sequences that could be predefined by the vehicle's manufacturer as an indication by a user to cause an authentication system to operate. Other sequences of button presses or other various manipulations of vehicle components or buttons or tactile interfaces may be used as well. Regardless of the sequence used, performing the sequence may be deemed an authentication trigger that commences the running of a predetermined authentication period. During the predetermined authentication period, EVIC 1602 may display instructions or actions that the user must take to authenticate himself, or herself, to a vehicle processing device coupled to bus 1502.

As shown in FIG. 16, after an authentication trigger event has occurred, EVIC display 1602A instructs the user to press the door unlock button on a first security device (key fob 1 in the figure). After the user presses the unlock button on key fob 1, EVIC display 1602B instructs the user to press the unlock button on key security device 2 (in the figure key fob 2). After the user presses the unlock button on key fob 2, EVIC display 1602C displays an activation code, which the user may enter into a user interface on his, or her, smart phone. The user's smart phone device may then transmit the activation code to a telematics services provider's server which may process the activation code in conjunction with the information related to the vehicle to confirm that the activation code is valid. If the server determines that the activation code is valid, the services provider may begin service to a processing device coupled to bus 1502, or to the user's smart phone that transmitted the activation code. Alternatively, if the user is attempting to pair/associate his, or her, smart phone device with one or more modules or devices coupled to bus 1502, the user may enter the activation code into a user interface on the smart phone, which may then store the activation code in a memory. When the user attempts to control the vehicle, for example operate the HVAC system of the vehicle, or unlock the vehicle's doors, with the smart phone or other device, the smart phone or other device may transmit the stored activation code to the one or more vehicle processing devices coupled to bus 1502 that is associated with the action the user is attempting to take, or to the equipment/component that the user is attempting to operate. If the activation code matches the code that EVIC display 1602C displayed during the authentication process, the processing devices in the vehicle causes the action requested by the smart phone to occur.

Figure 17:
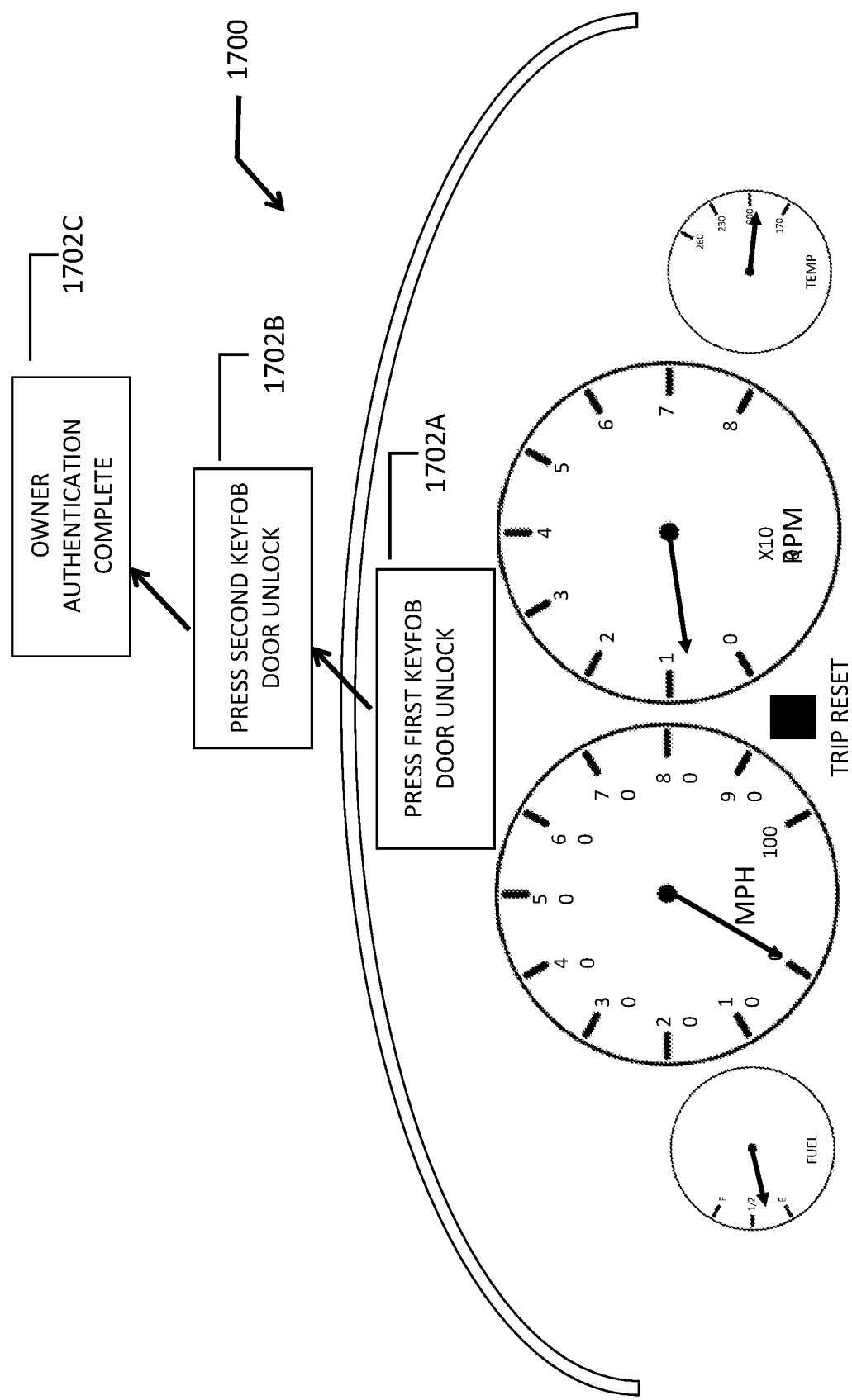
FIG. 17 illustrates a vehicle dashboard layout with an electronic vehicle information center display that does not display an activation code at the end of an authentication process.

Turning now to FIG. 17, the figure is similar to FIG. 16 except that EVIC display 1702C does not display an activation code at the end of the authentication process. This may be because a wireless module coupled to bus 1502 shown in FIG. 15 transmitted the activation code to a services provider's server automatically. Or, the wireless module coupled to bus 1502 may have transmitted the activation code automatically to the smart phone, which may then transmit the code to a processing device coupled to bus 1502 when the user device (i.e., smart phone or table) sends a request message to the vehicle that includes a request that a given action occur, like increasing the heat output of the vehicle or that the doors unlock, as described above in connection with FIG. 16.

Figure 18:
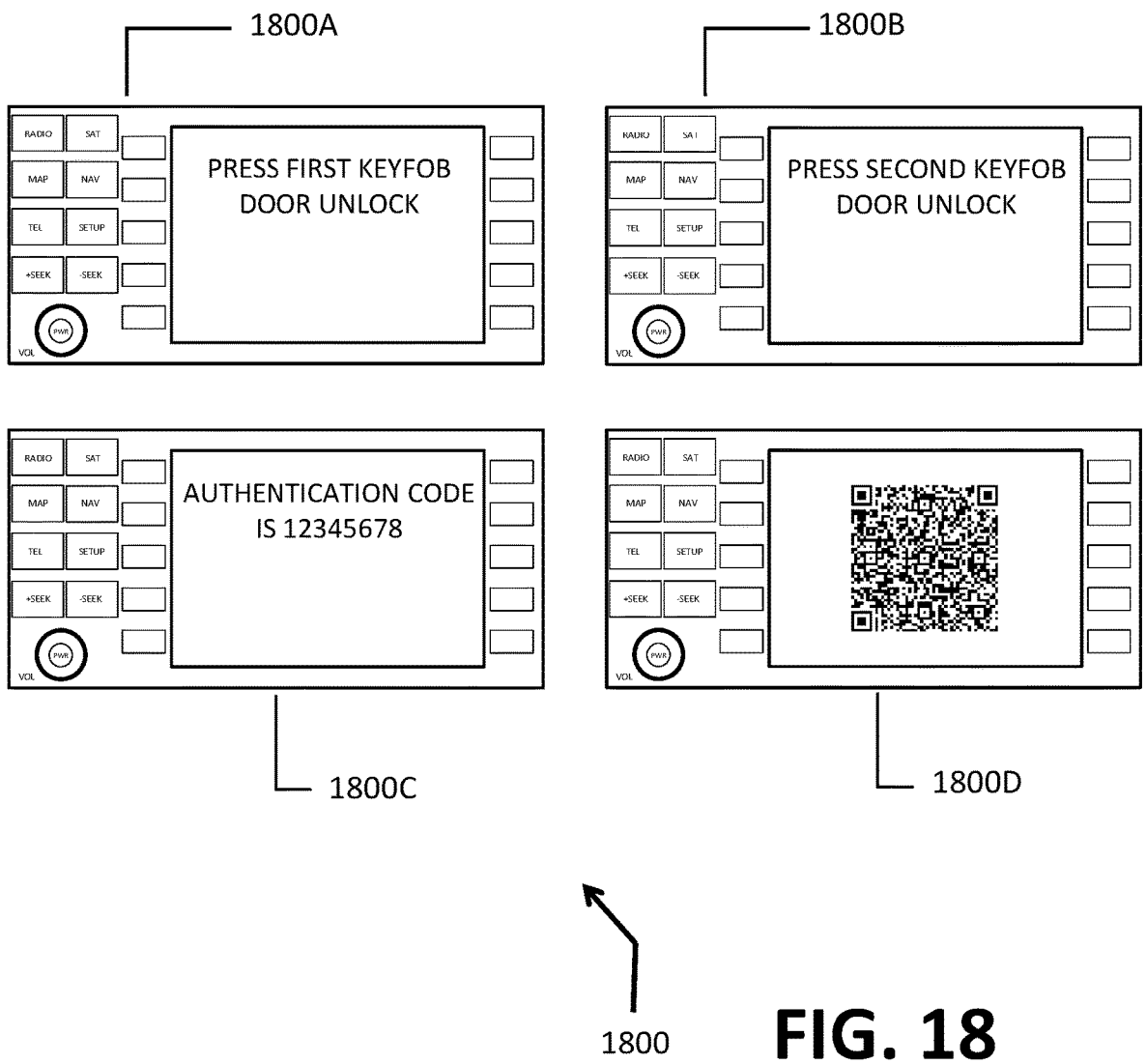
FIG. 18 illustrates different displays of information on a vehicle's infotainment system.

Turning now to FIG. 18, the figure illustrates four different displays of information that a display in an infotainment system 1800 may display. The displays 1800A, 1800B, and 1800C correspond to similar information that EVIC display 1602A, 1602B, and 1602C, respectively, sequentially show in FIG. 16. EVIC display 1800D, however, shows a QR code that may be displayed at the end of an authentication sequence. The QR code may contain an activation code, as shown in FIG. 13. Or, the QR code shown in infotainment display 1800D may be the QR code shown in FIG. 14 that does not contain an activation code. However, the QR code of FIG. 14 may contain information that the user's smart phone device may scan upon performing the authentication trigger sequence (i.e., pressing and holding the trip reset button while pressing the vehicle start button three times without having the brake pedal depressed). This would obviate having to manually enter information such as vehicle VIN into a smart phone app or obviate the need to scan a barcode or QR code affixed to the vehicle in an inconspicuous location, before performing an authentication sequence as instructed by infotainment displays 1800A, 1800B, and 1800C.

Figure 19:
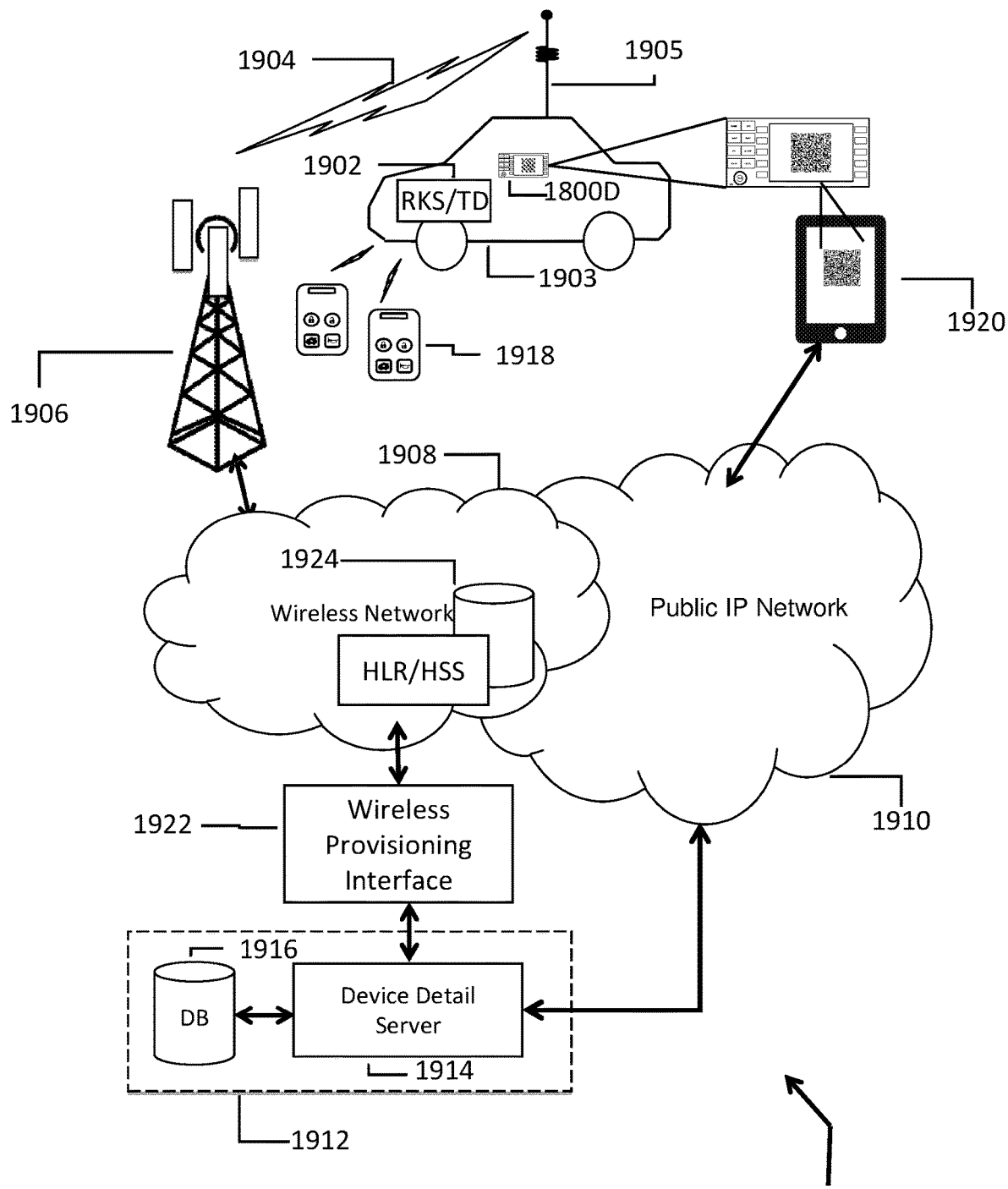
FIG. 19 illustrates a system for authenticating a user, or a user device, to a vehicle processing device, or more generally, to a machine device.

Turning now to FIG. 19, the figure shows a diagram of an overall system 1900 for authenticating a user, or a user device, to a vehicle processing device, or more generally, to a machine device. In system 1900, a telematics device 1902, which typically includes one or more vehicle processing devices coupled to a communication bus of vehicle 1903, can communicate wirelessly over wireless link 1904, which may be established between antenna 1905 of the vehicle, which is coupled to, or part of, telematics device 1902, and antenna 1905, which is typically part of a long range wireless service provider's wireless network 1908. Long range wireless network 1908 may be coupled to a public internet 1910, such as the world wide web.

Vehicle processing device 1902 may communicate messages back and forth over networks 1908 and 1910 to a service providers 'back end' central activation computer server equipment components 1912, which typically includes one or more computer servers 1914 and one or more databases 1916. Although server 1914 and database 1916 are typically located at the same physical/geographic location, and may even be components within a single housing sharing the same power supply and the same connection to Internet 1910, the server and database are shown separately to illustrate that they may be located separately from one another, either at the same location but, for example, in different rack spaces, or even at different geographical locations with different connections to network 1910.

Messages that telematics device 1902 may communicate back and forth with back end equipment 1912 may include messages that relate to authentication of a user who is attempting to establish service with the operator of the back end equipment via methods described above in connection with other figures that included the user making present two security devices 1918 as he, or she, request services by following a process to cause an authentication trigger event within, or very close to, vehicle 1903. Or, a user may be attempting to authenticate his, or her, smart phone 1920 so that it can interact with, and transmit and receive messages with, telematics device 1902 that is connected to a communication bus of the vehicle, or so that the smart phone can interact with other equipment or devices coupled to the communication bus of the vehicle.

After the user has followed an authentication process, as described above by performing actions with security devices 1918, or after the user has authenticated user device 1920 with vehicle 1903, back end equipment 1914 typically notifies, through wireless provisioning interface 1922, equipment of network 1908, which network equipment may include HLR, or HSS equipment 1924. After the notification that the user has authenticated himself, or herself, or his, or her, user device 1920, by performing an authentication sequence with security devices 1918 in the presence of vehicle 1903, and the back end equipment central activation computer server equipment 1912 has caused the provisioning of equipment 1924, equipment of wireless network 1908 may start billing for usage of the wireless network for traffic related to communication associated with an account established by the user authenticating himself with the backend central activation computer server equipment.

In an aspect discussed above in connection with other figures, during an authentication process, a user may be prompted by an application ("app") running on smart phone 1920 for vehicle information associated with vehicle 1903 to which the user is attempting to authenticate himself. Instead of having to manually find the information to enter and then enter it, the authentication sequence may include the vehicle's infotainment display 1800D, as described in connection with FIG. 18, displaying a code or symbol, such as the QR code shown in FIG. 13. This QR code may include vehicle-specific information, such as, for example, the vehicle's VIN, the current mileage on the odometer, as well as dealer information and a date of sale of the vehicle that may be associated with the vehicle. In such a scenario, instead of the user manually entering the information for upload to back end equipment 1912, he, or she, may scan the QR code and 'hit send' to almost automatically (automatic except for the step of scanning the QR code present on display 1800D) enter the information in the app before sending during the authentication sequence to the back end equipment.

The methods and systems described in previous paragraphs describe aspects of automated or semi-automated methods and systems that use two fobs, smart keys, or other security devices for authentication to, and to certify ownership of, a vehicle by a person requesting the establishing of telematics services. Operating on the assumption that from the very first vulnerable time, when a prospective buyer or test driver drives a car, he typically has access from a dealer to only one of the pair of smart keys, fobs, or other security devices, provided by the manufacturer for a new vehicle. Only after the prospective buyer becomes an owner does he have access to both smart keys. If the owner loses a key, most auto manufacturers have very secure methods of key duplication (to use an old-time term) and pairing of the new smart key to the vehicle. During the lifetime, no other temporary operator should normally have access to both keys simultaneously. Once a vehicle is sold to a new owner, the new owner takes possession of not only the car, but he will take possession both keys.

The methods and systems described herein relate to a solution that involves devices with Internet connectivity mobile applications. Although this is certainly the preferred embodiment, the solution can be implemented without those elements and the entire process operation can be carried out using nothing more than a tradition voice telephone. It should be recognized this is contemplated herein and the central premise of two smart remotes, smart keys, smart fobs, or other security devices applies to that manual method as well.

What is claimed is:

1. A system, comprising:
    a first security device that includes first unique information that is uniquely associated with a vehicle;
    a second security device that includes second unique information that is uniquely associated with the vehicle;
    an application to:
        receive a request to associate a user equipment device with the vehicle;
        receive the first unique information transmitted in a first security signal from the first security device;
        receive the second unique information transmitted in a second security signal from the second security device;
        determine that the first security signal was transmitted during a predetermined authentication period that began after the receiving of the request to associate the user equipment device with the vehicle;
        determine that the second security signal was transmitted during the predetermined authentication period; and
        associate the user device with the vehicle when a determination is made that the first unique information was transmitted in the first security signal during the predetermined authentication period and that the second unique information was transmitted in the second security signal during the predetermined authentication period.

2. The system of claim 1 wherein the first unique information and the second unique information are transmitted wirelessly from the first and second security devices, respectively, via a short-range wireless protocol.

3. The system of claim 1 wherein the first and second security devices are wireless devices uniquely associated with the vehicle, and wherein the unique association enables operation of the vehicle when either of the first or second security devices are within a predetermined range of the vehicle.

4. The system of claim 1 wherein the associating of the user device with the vehicle includes providing an activation code.

5. The system of claim 1 wherein the request to associate the user device with the vehicle is for purposes of accessing, controlling, or making a payment in connection with, the vehicle.

6. The system of claim 5 wherein the purposes of accessing, controlling, or making a payment in connection with the vehicle include at least one of: door unlocking, vehicle-trip reporting, providing of vehicle location, providing of battery-charge status, performing vehicle start, performing climate pre-conditioning, providing of fuel status, or downloading of point-of-interest information.

7. The system of claim 4 wherein the associating of the user device with the vehicle further includes receiving the authentication code after the providing of the authentication code, wherein the user device transmits the authentication code to a central activation computer server after the authentication code was provided.

8. The system of claim 1 wherein the predetermined authentication period is the same for both the receiving of the first security signal containing the first unique information from the first security device and the receiving of the second security signal containing the second unique information from the second security device.

9. The system of claim 1 wherein the application associates the user device with the vehicle only after determining that the the first security signal and the second security signal were transmitted within a predetermined range of the user device.

10. The system of claim 1 wherein the application is hosted by a central activation computer server.

11. The system of claim 1 wherein the request to associate the user device with the vehicle was received from the user device.

12. The system of claim 1 wherein the request to associate the user device with the vehicle is received wirelessly.

13. The system of claim 2 wherein the short-range wireless protocol is Bluetooth™.

14. A method, comprising:
    receiving a request to associate a user device with a vehicle;
    receiving first unique information contained in a first security signal transmitted from a first security device that is uniquely associated with the vehicle;
    receiving second unique information contained in a second security signal transmitted from a second security device that is uniquely associated with the vehicle;
    determining that the first unique information associated with the first security device was transmitted during a first predetermined authentication period that began after the receiving of the request to associate the user device with the vehicle;
    determining that the second unique information associated with the second security device was transmitted during a second predetermined authentication period that began after the receiving of the request to associate the user device with the vehicle;
    associating the user device with the vehicle when a determination is made that the first unique information was transmitted during the first predetermined authentication period and that the second unique information was transmitted during the second predetermined authentication period.

15. The method of claim 14 wherein the request to associate a user device with a vehicle was generated by the user device and wherein the steps of the method are performed by a computer device that is not the user device.

16. The method of claim 14 wherein the first and second security devices are wireless devices each uniquely associated with the vehicle, and wherein the unique associations enable operation of the vehicle when the first or second security devices are within a predetermined range of the vehicle.

17. A method for associating a user device with a vehicle, comprising:
   receiving a request to associate the user device with the vehicle;
   receiving first unique information transmitted from a first security device that is uniquely associated with the vehicle;
   receiving second unique information transmitted from a second security device that is uniquely associated with the vehicle;
   determining that the first unique information associated with the first security device was transmitted during a predetermined authentication period that began after the receiving of the request to associate the user device with the vehicle;
   determining that the second unique information associated with the second security device was transmitted during the predetermined authentication period;
   receiving an activation code generated by an application running on the user device;
   determining that the activation code was generated based on the first unique information and the second unique information; and
   associating the user device with the vehicle when the determination is made that the activation code was generated based on the first unique information and the second unique information.

18. The method of claim 17 wherein the first and second unique information were transmitted from the first and second security devices via Bluetooth™.

19. The method of claim 17 wherein the first and second unique information in first and second signals are received from the user device.

20. The method of claim 18 further comprising verifying that the authentication code was transmitted by the user device in connection with a request for purposes of accessing, controlling, or making a payment in connection with, the vehicle, which purposes may include at least one of: door unlocking, vehicle-trip reporting, providing of vehicle location, providing of battery-charge status, performing vehicle start, performing climate pre-conditioning, providing of fuel status, or downloading of point-of-interest information.

* * * * *